US012110818B2

(12) United States Patent
Robinson et al.

(10) Patent No.: US 12,110,818 B2
(45) Date of Patent: Oct. 8, 2024

(54) INTERNAL COMBUSTION ENGINE AND IGNITION SYSTEM WITH A PRE-CHAMBER

(71) Applicant: ERFINDER TECHNOLOGIES LIMITED, Winchester (GB)

(72) Inventors: Andrew John Robinson, Winchester (GB); Paul William Guthrie, Chemnitz (DE)

(73) Assignee: ERFINDER TECHNOLOGIES LIMITED, Winchester (GB)

( * ) Notice: Subject to any disclaimer, the term of this patent is extended or adjusted under 35 U.S.C. 154(b) by 0 days.

(21) Appl. No.: 17/768,867

(22) PCT Filed: Oct. 28, 2020

(86) PCT No.: PCT/GB2020/052723
§ 371 (c)(1),
(2) Date: Apr. 14, 2022

(87) PCT Pub. No.: WO2021/084246
PCT Pub. Date: May 6, 2021

(65) Prior Publication Data
US 2024/0093635 A1    Mar. 21, 2024

(30) Foreign Application Priority Data
Oct. 28, 2019  (GB) .................................... 1915615

(51) Int. Cl.
*F02B 19/10*  (2006.01)
*F02B 19/00*  (2006.01)
*F02B 19/12*  (2006.01)

(52) U.S. Cl.
CPC ............ *F02B 19/108* (2013.01); *F02B 19/12* (2013.01); *F02B 2019/002* (2013.01); *F02B 2201/062* (2013.01)

(58) Field of Classification Search
CPC .. F02B 19/108; F02B 19/12; F02B 2019/002; F02B 2201/062
(Continued)

(56) References Cited

U.S. PATENT DOCUMENTS 1,554,877 A     9/1925  Niefer
3,494,509 A  *  2/1970  McGuire ................ B65D 88/18
                                                   222/107
(Continued)

FOREIGN PATENT DOCUMENTS

CN    108730015 A  * 11/2018  .............. F02B 19/00
KR    20150068105 A    6/2015

*Primary Examiner* — Scott A Reinbold
(74) *Attorney, Agent, or Firm* — Dickinson Wright PLLC

(57) ABSTRACT

An ignition system for a vehicle internal combustion engine (12) has a capsule defining a pre-chamber (136), an ignition fuel supply system (500) configured to inject an ignition fuel to the pre-chamber to create an ignition fuel-air mix in the pre-chamber, an ignition surface (137) within the pre-chamber, the ignition surface being defined by an interior surface of the capsule and configured to be contacted by the ignition fuel in the pre-chamber to thereby ignite the ignition fuel by hot surface ignition, and at least one jet nozzle (152). The ignition fuel is characterised by having a carbon content by mass less than 65%, a hot surface ignition temperature less than 500 deg C., and a volumetric energy density (LHV) greater than 18 MJ/L. The at least one jet nozzle is configured such that ignition of the ignition fuel by contact with the ignition surface causes at least one of hot gases, partially combusted fuel and flames to leave the pre-chamber through the at least one jet nozzle.

17 Claims, 7 Drawing Sheets

(58) Field of Classification Search
USPC .......................................................... 123/253
See application file for complete search history.

(56) References Cited

U.S. PATENT DOCUMENTS

| | | | |
|---|---|---|---|
| 4,091,772 A | | 5/1978 | Heater et al. |
| 4,140,090 A | * | 2/1979 | Lindberg .............. F02B 19/108 |
| | | | 123/3 |
| 4,966,103 A | | 10/1990 | Schaub et al. |
| 5,392,744 A | | 2/1995 | Regueiro |
| 5,778,849 A | | 7/1998 | Regueiro |
| 8,925,518 B1 | | 1/2015 | Riley et al. |
| 9,528,434 B1 | | 12/2016 | Thomassin et al. |
| 2003/0116121 A1 | * | 6/2003 | Agama ..................... F02B 1/12 |
| | | | 123/259 |
| 2012/0103302 A1 | | 5/2012 | Attard |
| 2013/0318946 A1 | * | 12/2013 | Morris .................... C10L 1/125 |
| | | | 60/273 |
| 2019/0323416 A1 | * | 10/2019 | Nomura ............. F02B 19/1019 |
| 2021/0131337 A1 | * | 5/2021 | Bromberg ............ H05H 1/2418 |
| 2021/0221351 A1 | * | 7/2021 | Novek ................... F03B 13/06 |

\* cited by examiner

INTERNAL COMBUSTION ENGINE AND IGNITION SYSTEM WITH A PRE-CHAMBER

CROSS-REFERENCE TO RELATED APPLICATIONS

This application is a U.S. National Stage of International Application No. PCT/GB2020/052723, filed on Oct. 28, 2020, which claims the benefit and priority of Great Britain Patent Application No. GB 1915615.7, filed on Oct. 28, 2019, the entire contents of which are incorporated herein by reference.

INTRODUCTION

The present invention is concerned with an internal combustion ('IC') engine. More specifically, the present invention is concerned with IC engines for motive power in mobile applications, including automotive and marine. IC engines have historically been used throughout the world to power a range of applications. The most popular application has been powertrain—that is the use of such engines in moving vehicles to provide motive power.

Although vehicles driven by electric motors powered by onboard batteries (battery electric vehicles or 'BEV's) are becoming more common, there remains a need for efficient, reliable IC engines in both hybrid vehicles and in vehicles in which the current level of BEV technology does not fulfil requirements. It is envisaged that internal combustion engines will have a place in the automobile and wider vehicle market for many years to come.

All internal combustion engines work on the same principle—the ignition of an air-fuel mixture to release energy and drive a moving part, which provides mechanical power output. In reciprocating piston type IC engines, a fuel-air mixture is ignited within a cylinder, and the resulting increase in pressure is used to move a piston. The piston is connected to a crank which in turn drives a crankshaft to produce motive power. For example, most automotive engines rely on spark ignition (gasoline/petroleum powered engines) or compression/auto-ignition (diesel powered engines).

In all cases, the process of combustion produces not only thermal energy (to heat and thereby expand the working fluid) but also products of the chemical reactions collectively referred to as 'emissions'. These emissions are typically either deposited within the engine or exhausted.

The optimum combustion process must therefore satisfy at least three criteria for best performance:
a) most efficient conversion of chemical to thermal energy;
b) most efficient conversion of thermal energy to mechanical work at the crankshaft; and,
c) least production of harmful emissions.

It is convenient to assume that the combustion process deals simply with reactants and completely reacted products of combustion which are in full equilibrium at the desired temperature and pressure. The reality is that during high temperature combustion, major species dissociate to form a range of minor species. The ideal combustion products species obtained by burning a hydrocarbon in air are: $CO_2$, $H_2O$, $O_2$, $N_2$. However dissociation of these species and among the dissociation products produces the additional dissociation species: $H_2$, OH, CO, H, O, N, NO, and potentially others.

The pollutants of combustion which directly and detrimentally affect the environment are Carbon Monoxide (CO), NO and $NO_2$ which are collectively known as Nitric Oxides ($NO_x$), Sulphur Dioxide ($SO_2$) and Particulate Matter (PM) or Soot. Hydrocarbon (HC) emissions arise from incomplete combustion.

In recent years Carbon Dioxide ($CO_2$) has been added to the list of regulated exhaust emissions for its potential to affect the atmospheric balance of radiation absorption and re-radiation, otherwise known as the "greenhouse effect". The production of $CO_2$ is an inevitable result of burning hydrocarbons in air. Therefore, the only cure for $CO_2$ emissions is to reduce the consumption of carbon containing fuels used in combustion processes (i.e. to increase engine efficiency).

Significant improvements have been made to the efficiency of IC engines and reduction of harmful exhaust emissions in the last thirty years. Worldwide tightening of emissions laws have forced automotive manufacturers to make those improvements while attempting to maintain price competitiveness and consumer satisfaction.

Cleaning up exhaust emissions after they have left the engine is called exhaust after-treatment. Exhaust after-treatment can be achieved in a number of ways depending on the pollutant species of interest. Catalytic exhaust after-treatment utilising a catalytic reactor is the most universally accepted method for automotive applications.

In IC engines, the relative air/fuel ratio $\lambda$ (lambda) is expressed as:

$$\lambda = \frac{(F/A)_{stoich}}{(F/A)_{actual}}$$

For fuel-lean mixtures $\lambda>1$, for stoichiometric mixtures $\lambda=1$, for fuel-rich mixtures $\lambda<1$.

A catalytic reactor which processes CO, HC and $NO_x$ is termed a three-way catalyst and requires a relative air/fuel ratio of one for maximum efficiency. Any deviation from $\lambda=1$ results in a substantial reduction in catalyst efficiency. It is therefore no surprise that the majority of gasoline fuelled engines operate with close to $\lambda=1$.

In recent years other catalytic reactors have been developed to treat $NO_x$ at equivalence ratios of less than one—i.e. lean operation. One solution is known as a '$NO_x$ storage catalyst' which requires periodic regeneration with a richer air-fuel ratio. Another solution is known as 'Selective Catalytic Reduction' (SCR) which uses Ammonia (supplied as Urea fluid) to reduce $NO_x$ over a catalyst. It requires a separate Urea dosing system which needs to be refilled periodically. Suffice to say that $NO_x$ treatment for lean mixture operation is today a significant challenge.

Another addition to the exhaust after-treatment system is the particle filter to reduce particulate emissions. Compression ignition and spark ignition engines must comply with exhaust particle mass (PM) and number (PN) standards. The exhaust particle filters add cost, as well as deterioration of engine performance through higher back pressure.

All together exhaust after-treatment for conventional gasoline and Diesel engines has become very expensive and complicated. Although successful in controlling harmful emissions, exhaust after-treatment necessitates considerable development effort and represents a significant reliability and durability challenge over vehicle lifetime. Reducing the engine emissions therefore has significant advantages, inasmuch as the need for after-treatment can be reduced or eliminated.

The present invention seeks to reduce the reliance on exhaust after-treatment and ensure that the products of combustion contain the minimum of harmful species. In addition, since $CO_2$ is the product of successful hydrocarbon combustion the solution is to improve engine cycle efficiency and reduce fuel consumption.

It has been demonstrated that for a leaner fuel-air mixture ($\lambda>1$), efficiency increases. This occurs in part because the burned gas temperature after combustion is lower than for $\lambda=1$, decreasing the burned gas specific heats and thereby increasing the effective value of ratio of specific heat of the burned gas over the expansion stroke. The efficiency increases because, for a given volume expansion ratio, the burned gases expand through a larger temperature ratio prior to exhaust; therefore, per unit mass of fuel, the expansion stroke work is increased. The other significant benefit of reduced burned gas temperature is the reduction in heat losses near top dead centre of the cycle.

This, of course, has a limit and it is accepted that the practical limit for $\lambda$, beyond which useful cycle efficiency improvement cannot be achieved is somewhere around 2.0 (note that $\lambda>1.6$ is known as 'ultra-lean'). In fact, brake overall engine efficiency can fall for values of $\lambda>2.0$ where consideration of inlet throttling losses may result in leaner mixtures.

When considering combustion processes it is necessary to distinguish between premixed and non-premixed modes. Non-premixed combustion is characterised by the injection of a fuel into an oxidation gas where the fuel self ignites due to the temperature of the gaseous oxidant (typically air). Conventional Diesel engines use mostly non-premixed mode of combustion. Because the fuel burns only at the periphery of the injected fuel spray, the temperature of the flame is high while the surrounding gas temperature is lower. It is that high combustion temperature which results in very high $NO_x$ production. At the same time because the fuel is not completely mixed with the oxidant, high amount of particulates are formed which is identified by the luminescent yellow-orange flame typical of Diesel combustion. Although the overall air-fuel ratio is low, the non-premixed combustion mode is responsible for both high $NO_x$ and particulate emissions. It can be mitigated in part by using temperature reducing means such as exhaust gas recirculation, but exhaust after-treatment is nonetheless required.

For premixed combustion the fuel and air are thoroughly mixed together before the mixture is ignited. Typically for internal combustion engines a spark discharge is to initiate premixed combustion. From a point source spark discharge a flame kernel develops and a flame traverses the unburned mixture to complete the combustion of the mixture. The air-fuel mixture can vary with typically the leanest mixture that can be successfully burned at around $\lambda=1.4$. At greater air-fuel ratios (i.e. leaner mixtures) the flame will quickly extinguish as there is insufficient energy to sustain it. That makes premixed ultra-lean combustion impossible with conventional spark ignition systems.

In addition, as mixtures become leaner, the increasing oxygen concentrations increase the combustion temperature until a peak is reached at $\lambda=1.1$. At that level of lean air-fuel ratio the $NO_x$ emissions are at a maximum and hence partly lean mixtures have always been avoided to reduce $NO_x$ emissions. However, a premixed ultra-lean mixture $\lambda>1.6$ produces extremely low $NO_x$ emissions near zero as long as the mixture can be effectively burned.

For both premixed and non-premixed combustion operating with overall lean air-fuel mixtures the production of CO and HC still requires some exhaust after-treatment. CO is usually very low for lean mixtures and not a challenge, but HC can be problem if the combustion is not complete or high crevice volume hydrocarbons are produced. An oxidation catalyst can perform that task effectively as long as the gas temperature is sufficiently high to promote oxidation. Excess oxygen supports oxidation and is not a hindrance to catalyst efficiency. However, management of the exhaust gas temperature is essential to ensure the necessary catalyst conversion ratios to maintain low tailpipe emissions. It is therefore necessary to limit the air-fuel at light loads to keep the exhaust gas temperature high enough for the catalyst function.

A premixed ultra-lean mixture, i.e. $\lambda>1.6$, should be the goal to increase engine efficiency (i.e. to reduce $CO_2$), and to simultaneously reduce both particulate and $NO_x$ emissions. A further benefit of premixed ultra-lean combustion is that it allows for higher compression ratios without the usual combustion 'knock' problems. Conventional spark ignition engines operating near $\lambda=1.0$ are limited by their combustion process because it is predicated on the air-fuel mixture not self-igniting. If the mixture does self-ignite it causes abnormal combustion called knock which leads to engine damage. Knock is created by several factors including the compression ratio, the fuel octane rating, spark timing, rest gas amount and shape of the combustion chamber. Attempts to mitigate the problem usually lead to reduced engine efficiency.

With premixed ultra-lean combustion the air-fuel mixture has less tendency to self-ignite and is more resistant to engine knock. That is beneficial as higher compression ratios can be used which increase engine efficiency. This is demonstrated with large natural gas engines (used in stationary applications such as electricity generation) using premixed ultra-lean combustion.

It is apparent that premixed ultra-lean fuel-air mixtures would be overall beneficial in improving engine cycle efficiency and reducing emissions, but there are significant challenges in realising premixed ultra-lean combustion in an IC engine. To overcome the challenge of burning a highly diluted mixture it is necessary to employ a combustion process different to a conventional spark ignited engine. Since a flame traversing the combustion chamber will not be self-sustaining it is necessary to provide multiple ignition sites throughout the combustion chamber. Each ignition site then gives rise to a flame kernel which has only a short distance to develop and combustion the surrounding mixture. Such distributed ignition sites have been shown to provide the necessary ignition capability for premixed air-fuel ratios beyond $\lambda>2.0$.

In order to provide a distributed ignition medium it has been found that jets of hot gases introduced into the main combustion chamber by an adjacent pre-chamber is effective in supporting premixed ultra-lean combustion. Variations in the concept have been tested and for large natural gas engines and have been in production for decades. Whether called 'pre-chamber', 'jet ignition' or 'flame jet ignition' the concepts are essentially the same. The jets of gases may be characterised as having high temperature, high velocity and high turbulence and may contain flames depending on the jet orifice design. The gas jets are able to penetrate the combustion chamber and provide multiple ignition sites. The kinetic energy of the jets ensures fast and complete combustion.

Burning a small quantity of fuel as an ignition source, the chemical energy of the fuel will multiply the total ignition energy. A typical spark ignition discharge delivering only about 2 mJ of energy can be replaced by a pre-chamber jet ignition which is capable of delivering thousands of times more energy (2-10 J) depending on the pre-chamber size and fuel quantity. That is the key to supporting premixed ultra-lean combustion.

The pre-chamber designs which have been employed in the past include large and small volumes using spark ignition. Two classes of pre-chamber are known as either passive or positive fuel feed. Passive pre-chambers rely on air-fuel mixture from the main chamber to be introduced via the jet passages. Positive fuel feed pre-chambers rely on a separate fueling system to introduce fuel into the pre-chamber. It is the positive fuel feed pre-chamber which offers the best performance compared to a passive design.

Positive fuel feed pre-chamber designs can successfully support premixed ultra-lean combustion as evidenced by production systems (large natural gas engines) and numerous research investigations. Where the real challenge lies for smaller cylinder sizes and specifically mobile applications, is how to industrialise the solution taking into account all the requirements.

The requirements of the automotive fuel pose many challenges due to variation of the fuel chemistry in different world markets as well as within individual markets. Gasoline fuel for example is comprised of many hundreds of different chemicals and may be blended according to refinery requirements. That may also include blending oxygenated fuels such as ethanol. Fuels are also blended according to temperature requirements to assist cold starting in winter and prevent vapour formation in summer. Fuels also contain deposit reducing chemicals. Although certain fuel characteristics are defined such as octane rating, many other ignition related characteristics have to be accounted for in developing an engine. For a pre-chamber jet ignition that poses several challenges.

For a pre-chamber jet ignition to work reliably under all operating conditions it means that the gas jets have to behave predictably independently of which fuel is being used. Since most pre-chamber jet ignition concepts operate with a spark plug and use the same fuel as the main combustion chamber the challenges are already known or can be predicted. For spark ignition of any mixture the correct air-fuel ratio has to be present at the spark gap when a spark discharge occurs. If not, at worst it will mis-fire and otherwise the gas jets will be detrimentally affected. Different fuel specifications affect the behaviour of the gas jets and hence combustion. Although testing a wide range of different fuels is possible it presents a significant challenge to the engine calibration and real-world use. Although a spark discharge cannot support premixed ultra-lean combustion, it is extremely reliable and predictable as an ignition source. That is one reason it has prevailed for over one hundred years in IC engines. If a pre-chamber jet ignition is not robust for all fuel types, it will not be successful in the market.

Another challenge is management of the pre-chamber temperature. For spark ignited concepts it is essential to keep the interior surface temperature low enough that pre-ignition of the air-fuel mixture does not occur. At the same time the fuel injector must be kept cool to prevent deposition at the injector tip. Since the pre-chamber fuel injector has low flow rates it cannot be fuel-cooled like a main chamber injector. Adding cooling passages is possible but creates challenges in an already crowded cylinder head. Additionally, there is the possibility of deposits forming inside the pre-chamber which would negatively affect the jet passages. If the jet passages are even partially blocked the whole ignition system is negatively affected.

A challenge peculiar to smaller cylinder sizes is one of packaging space in the cylinder head. Although small pre-chambers in the order of 5% of the compressed cylinder volume can be used, the size of fuel injectors and spark ignition hardware do not scale down for smaller cylinder sizes. This presents difficulties in packaging a fuel injector and spark plug into a pre-chamber. Even if it can be achieved the installation and subsequent servicing is made very challenging.

With knowledge of the aforementioned weaknesses of existing pre-chamber jet ignition systems it is the aim of the invention to address those deficiencies with particular focus on mobile applications (i.e. IC engines used to generate motive power in vehicles, either directly or via generation of electricity for motive power).

For a full understanding of the invention, it is useful to understand some of the prior art in the broader technical field, which although passingly similar to the invention operates on an entirely different principle.

U.S. Pat. Nos. 8,925,518B and 4,966,103A relate to 'dual fuel' engines. In the general field of IC engines, 'dual fuel' engines are those that are fundamentally designed to operate with one primary fuel type. A second supplemental fuel is used to substitute the primary fuel up varying amounts of substitution. However the engine can always operate on 100% of the primary fuel. Hence the ignition system used in such engines does not change. In the case of a Diesel engine operating in dual fuel mode it is the injection of Diesel and its autoignition in hot compressed gas which provides a source of ignition. Supplemental fuels, such as natural gas, are typically introduced into the air inlet of the engine and are ignited by the injected Diesel fuel. Notably the engine cannot operate wholly on natural gas without the Diesel injection providing ignition. This is the typical industry understanding of a dual fuel engine.

For example, the engine of US'518 has embodiments identified as engine 400 and 500 where Diesel fuel is the primary fuel. In those examples the engine operates as an indirect injection Diesel engine. Therefore all of the main chamber fuel is introduced into the pre-chamber (like the L'Orange concept). Supplemental (substitution) natural gas is introduced into the pre-chamber and ignition is achieved by the injection of Diesel fuel in the pre-chamber. In that case the pre-chamber has to be sized large to allow for the 100% Diesel operation. That is a compromise of that invention. Both documents disclose the use of a pre-chamber, but importantly they do not consider the use of a separate and different ignition fuel.

U.S. Pat. Nos. 5,778,849 and 5,392,744A also disclose insulated pre-chambers. However in both cases the patents refer to a pre-combustion chamber of the L'Orange type used extensively by Daimler Benz for many decades. All the primary fuel for the main combustion chamber is introduced into the pre-combustion chamber (i.e. not just fuel for ignition purposes as with the present invention). Therefore these chambers tend to be very large, and typically suffer heat transfer loss problems. The only purpose of both inventions is to create a pre-combustion chamber which has reduced heat losses. It is noted that L'Orange concept was ultimately replaced by direct injection Diesel because the former was less efficient due largely to high heat losses through the pre-combustion chamber.

STATEMENTS OF INVENTION

According to a first aspect of the invention, there is provided an ignition system comprising: a capsule defining a pre-chamber; an ignition fuel supply system configured to inject an ignition fuel to the pre-chamber to create an ignition fuel-air mix in the pre-chamber; an ignition surface within the pre-chamber, the ignition surface being defined by an interior surface of the capsule and configured to be contacted by the ignition fuel in the pre-chamber to thereby ignite the ignition fuel by hot surface ignition; and at least one jet nozzle. The ignition fuel is characterised by all of the following characteristics: a carbon content by mass less than 65%; a hot surface ignition temperature less than 500 deg C.; and a volumetric energy density (LHV) greater than 18 MJ/L. The at least one jet nozzle is configured such that ignition of the ignition fuel by contact with the ignition surface causes at least one of hot gases, partially combusted fuel and flames to leave the pre-chamber through the at least one jet nozzle.

The ignition fuel may be an ether. The ignition fuel may be diethyl ether. The ignition fuel may have a freezing point below 40 degrees Celsius. The ignition fuel supply system may be configured to inject the ignition fuel into the pre-chamber at a pressure less than 200 bar.

In some embodiments, the capsule is at least partially constructed from a material having a heat conductivity of below 20 W/mK, for example below 15 W/mK, below 12 W/mK, below 10 W/mK, below 8 W/mK, below 6 W/mK, or below 5 W/mK. The capsule may be substantially entirely constructed from a material having a heat conductivity of below 20 W/mK, for example below 15 W/mK, below 12 W/mK, below 10 W/mK, below 8 W/mK, below 6 W/mK, or below 5 W/mK. The capsule may have a heat conductivity of below 20 W/mK, for example below 15 W/mK, below 12 W/mK, below 10 W/mK, below 8 W/mK, below 6 W/mK, or below 5 W/mK. The term "constructed" refers to the use of the material in forming the walls which define the capsule, rather than simply referring to the use of the material as a surface coating applied after the capsule has been formed.

In some embodiments, the capsule is at least partially constructed from a material having a maximum service temperature of at least 750 degrees Celsius, for example at least 800 degrees Celsius, at least 850 degrees Celsius, at least 900 degrees Celsius or at least 950 degrees Celsius. The capsule may be substantially entirely constructed from a material having a maximum service temperature of at least 750 degrees Celsius, for example at least 800 degrees Celsius, at least 850 degrees Celsius, at least 900 degrees Celsius or at least 950 degrees Celsius.

In some embodiments, the capsule is at least partially constructed from a material having a flexural strength of at least 500 MPa, at least 60 MPa, at least 700 MPa, or at least 800 MPa.

In some embodiments, the pre-chamber is at least partially constructed from a ceramic material. The pre-chamber, or "capsule" may be substantially entirely constructed from a ceramic material. The ceramic material may define the ignition surface. The capsule may be a ceramic capsule. In some embodiments, the ceramic capsule is constructed from Yttria partially stabilized zirconia oxide.

In some embodiments, the capsule is a superalloy capsule. The superalloy capsule may be constructed from a superalloy material. The superalloy material may have one or more of the following characteristics: a heat conductivity of below 10 W/mK, a maximum service temperature of at least 750 degrees Celsius, and a flexural strength of at least 500 MPa.

The ignition system may comprise a heater configured to heat the ignition surface upon cold start or cold operation. The heater may be a glow plug. The glow plug may be a low voltage metal glow plug. The glow plug may be a low voltage ceramic composite glow plug.

According to a second aspect of the invention there is provided a vehicle internal combustion engine comprising: at least one cylinder defining a combustion chamber; a piston disposed for movement within the at least one cylinder to define a swept volume of the at least one cylinder being less than or equal to 3.0 litres; a primary fuel supply system configured to supply a primary fuel to the combustion chamber to create a primary fuel-air mix in the combustion chamber; an ignition system comprising: a capsule defining a pre-chamber having a volume less than the swept volume of the cylinder; an ignition fuel supply system configured to inject an ignition fuel, which differs from the primary fuel, to the pre-chamber to create an ignition fuel-air mix in the pre-chamber; an ignition surface within the pre-chamber, the ignition surface being defined by an interior surface of the capsule and configured to be contacted by the ignition fuel in the pre-chamber to thereby ignite the ignition fuel by hot surface ignition; at least one jet nozzle in fluid communication with the combustion chamber of the cylinder; wherein the ignition fuel is characterised by all of the following characteristics: a carbon content by mass less than 65%; a hot surface ignition temperature less than 500 deg C.; and, a volumetric energy density (LHV) greater than 18 MJ/L, and wherein ignition of the ignition fuel by contact with the ignition surface causes at least one of hot gases, partially combusted fuel and flames to enter the combustion chamber through the at least one jet nozzle to thereby ignite the primary fuel.

By "nozzle", we mean a passage that increases the velocity of the fluid from the pre-chamber following ignition. The nozzle may be any shape—for example constant cross-section, convergent or divergent or any combination thereof.

Advantageously, by using a second type of fuel as the ignition fuel, the present invention overcomes the aforementioned problems in variability of the ignition fuel to create a reliable, robust and durable ignition system independent of and tolerant of the primary fuel used. Provision of an ignition fuel ignited by a hot surface mode addresses the practical issue of packaging the solution into small cylinder sizes by removing the need for a spark ignition system.

Hot surface ignition has further advantages over spark ignition. Ignition coils and high voltage (HT) leads associated with spark ignition are prone to reliability problems. High voltage also leads to corona discharge and erosion of various insulating materials. Ignition coils are sensitive to heat and as such coil mounting in the hot engine environment can be problematic. Typical spark plugs also require regular replacement as the electrodes wear. The electrodes and/or ceramic in of the spark plug may be subject to deposit formation, causing malfunction. The ceramic may also suffer from corona erosion and arcing external to the combustion chamber. High voltage spark ignition systems are also a source of electromagnetic interference, which means that the ignition coils and leads need to be shielded to prevent problems with adjacent electric components. Finally, spark ignition is not suitable for some applications where it may present a hazard or risk.

This type of ignition system is known as a 'jet spray' ignition system. Fundamentally, this type of jet spray ignition creates a high-energy distributed ignition medium throughout the main chamber. In this way, the ignition energy can reach between 1,000 and 10,000 times the energy of a conventional spark plug (typically 3 mJ). This facilitates ultra-lean combustion to achieve efficient, low emission running. In particular ultra-lean premixed combustion achieves extremely low $NO_x$, very low levels of residual HC, CO and particulate matter (PM). Simultaneous and fast burning of the fuel and air mixture across all areas of the combustion chamber also prevents abnormal combustion known as 'knocking'.

Using such a system avoids the need for a spark plug, and as such as well as saving on packaging space, reliability and cost. The pre-chamber of the present invention overcomes a significant durability issue of spark plug electrode wear typical of operation inside a pre-chamber. Hot surface ignition provides for a wear free ignition process.

The present invention also supports any type of main chamber air and fuel combustion, providing the air-fuel mix is lean enough to avoid pre-ignition when ingested into in the pre-chamber.

Because the ignition is initiated by a hot surface, there is no cylinder pressure limitation as with conventional spark ignition systems. As gas pressure and hence density increase, the required breakdown voltage increases. Therefore, highly boosted engines pose no problem for the hot surface ignition process of the present invention. The cylinder pressure limitation for spark plugs is particularly problematic because higher breakdown voltages often lead to malfunction of the spark plug. The problem is made worse by electrode wear because an increasing gap increases the breakdown voltage even further. Smaller spark plug gaps to start with result in poor ignition so the problem is very difficult to solve. The use of exotic materials for spark plug electrodes to reduce wear is costly.

Preferably the or each cylinder has a swept volume less than or equal to 3.0 litres. The invention is particularly well suited to such engines, which are typically utilised in mobile/vehicular applications as opposed to those over 3.0 litres which are typically used in static/power generation applications.

Preferably the ignition fuel has a much lower hot surface ignition temperature than the primary fuel.

Preferably, the ignition fuel is an ether. More preferably, it is diethyl ether (DEE, $C_4H_{10}O$).

The applicant has identified that DEE has a particularly surprising and advantageous set of properties making it well suited to use as an ignition fuel for the purposes of the invention. In particular, DEE has the following key features:
A low hot surface ignition temperature;
A high volumetric energy density (MJ/L); and,
A low carbon number relative to primary fuels such as gasoline or diesel.
Is an oxygenated fuel requiring less air for stoichiometric combustion DEE is particularly well suited to hot surface ignition due to its low surface ignition temperature (350 degrees C.). This is the lowest of all commercially known hydrocarbon fuels by about 200 degrees C. By comparison, Diesel is around 650 degrees C. and gasoline 800 degrees C. In fact, DEE would be ill-suited as a primary fuel for conventional spark ignition engines for the same reason—contact with hot components or autoignition would ignite the DEE before the spark was created. Therefore the combination of DEE and hot surface ignition in a pre-chamber is particularly advantageous, and allows the timing of the ignition system to be determined by ignition fuel injection alone, simplifying control of the engine. Notably, DEE has been actively disregarded in the art as a main fuel candidate for IC engines due to its hot surface and autoignition properties, which would cause problems in traditional engine architectures.

In terms of energy density, DEE has a volumetric energy density of 24.18 MJ/L. Calculations by the applicant demonstrate that the volumetric energy density of DEE is such that a relatively modest tank capacity (about 20 litres for a gasoline engine running at 5 L/100 km) can provide adequate ignition fuel for 10,000 km of driving in an automobile application. This means that the ignition fuel can simply be replenished upon service (much like present day Diesel SCR urea tanks).

Advantageously, a low carbon number provides for reduced CO2 levels upon combustion. A low carbon number also provides for reduced fuel deposit formation, which is further enhanced by DEE's low temperature of vapourisation. The residence of liquid fuel on hot surfaces is a known cause of deposit formation so DEE avoids that effectively. As an oxygenated fuel, DEE produces very low soot when combusted. The clean burning nature of DEE is also advantageous in preventing deposit formation apart from the obvious advantages in reduced engine out emissions.

Other advantages of DEE are as follows:
DEE is a liquid at ambient temperatures and pressures.
DEE is an oxygenated fuel and requires less air to form a stoichiometric mixture compared to some other hydrocarbons such as gasoline and Diesel. The stoichiometric ratio by mass of DEE is 11.1, producing a Lower Heating Value of 2.8 MJ/kg when combusted. This means that DEE requires 24% less air to produce 7.9% more energy than a stoichiometric mixture of gasoline and air.
Further, DEE is a single component fuel which means that there is no variability in production of the fuel compared to multi-component fuels which tend to vary in composition across the globe. It is also completely predictable in terms of its behaviour as compared to multi-component fuels like gasoline and Diesel. DEE can also be stored and delivered across a wide range of temperatures therefore use in very cold and hot ambient conditions, required by mobile applications is possible without the use of additives or other fuel conditioning means. This is particularly relevant to conventional transport fuels such as gasoline which needs to be blended specifically for summer and winter to control volatility for cold and hot starting. In winter Diesel has specific challenges with low temperature where is can cease to remain in liquid state. DEE has no such issues remaining a liquid down to minus 116 degrees C. (similar to Ethanol). Because of its relatively low boiling temperature and heat of vaporisation DEE can be prepared for ignition at very low ambient temperatures required for mobile applications.
DEE is a known substance (in other technical fields) and can be produced from ethanol, which can be produced from either fossil, bio or synthetic basis. This makes DEE a convenient large scale fuel for carbon-neutral production.

Further, as an ignition fuel DEE does not require high injection pressures (at least 100 bar to overcome cylinder pressure at ignition timing) because of its inherent low viscosity and relatively low boiling point of DEE—that reduces the cost and complexity of the fuel injection equipment. Considering a highly boosted engine (2.8 pressure ratio) with a compression ratio of 14:1, the maximum cylinder pressure will be around 87 bar at the time when ignition fuel should be introduced into the pre-chamber.

Alternative ignition fuels are possible. For example, but not limited to are the following: Dimethyl ether (DME) is one candidate, being chemically close to diethyl ether. Dimethyl methane (DMM) is another, and oxymethylene ether (OME1) a third. Although the hot surface ignition temperatures of these fuels are relatively low (although not as favourable as DEE), they have a relatively low volumetric energy density making them less desirable for mobile applications (as the ignition fuel tank would need to be considerably larger than for DEE). It is the combination of a low hot surface ignition temperature and high volumetric energy density that makes DEE the most suitable candidate for mobile applications in particular.

Preferably the ignition fuel supply system is configured to inject the ignition fuel into the pre-chamber at a pressure less than 200 bar, and more preferably 100 bar. Although higher pressures are possible the cost of the fuel delivery equipment increases significantly at higher values. Ultimately higher injection pressures than 200 bar would only be required for fuel with high viscosity and require such pressure to provide adequate atomisation of the fuel in the pre-chamber. Therefore fuels which require lower pressure for atomisation are always preferable from a cost and durability perspective.

Preferably the ignition fuel supply system is configured to inject the ignition fuel into the pre-chamber of quantity less than 5% equivalent energy content of the main chamber fuel introduced into the main cylinder.

Preferably the primary fuel supply system is configured to premix primary fuel-air mixture prior to combustion.

The primary fuel supply system may be an indirect injection system, having e.g. multiple port or throttle fuel injector.

The primary fuel system may also be an indirect fumigation system for gaseous fuels The primary fuel supply system may also be a direct injection system.

The primary fuel system may also be any combination of direct and indirect systems Preferably, the ignition system comprises a ceramic capsule defining the pre-chamber. A ceramic material for this type of application needs to have a low thermal conductivity compared to typical metals like steel, low coefficient of thermal expansion, high fracture toughness, high bending strength and a high maximum service temperature. Examples of such ceramics include sintered Silicon Nitride ($Si_3N_4$) and Yttria partially stabilized Zirconia Oxide (YTZP). Mass production techniques are well established for such materials. In such embodiments, the ceramic material defines part of the ignition surface. Preferably the ceramic material has relatively low thermal conductivity. In the case of Silicon Nitride its thermal conductivity is 30 W/m·degree K which is similar to typical Stainless Steels which might be used for an ignition capsule e.g. 440 C Martensitic Stainless Steel. On the other hand the Zirconia Oxide ceramic has a very low thermal conductivity of only 3 W/m·degree K. For both ceramics mentioned they have a very high maximum service temperature in excess of most metals which start to degrade around 550 degrees C. Whereas the ceramics mentioned can operate at greater than 800 degrees C. The high temperature capability of the ceramic is a key property for the ignition capsule in respect of the nozzles. Without it, thermal gas erosion would occur which quickly destroys the nozzle geometry and function of the igniter. Either ceramic mentioned or one with equivalent properties could be used with an appropriate design which might include an air gap to assist in temperature distribution within the capsule. Because of the particularly high maximum service temperature of the ceramic, it provides a better thermal barrier than most metals. Although some special superalloy metals, typically used in aerospace applications, might offer high temperature capability, their manufacture would also be costly for mass production so they are not preferable. Since the ignition fuel relies on hot surface ignition, a ceramic ignition capsule (pre-chamber) provides exactly that while preventing heat transfer to adjacent parts. The ceramic capsule also shields the ignition fuel injector tip from the high temperatures within the cylinder. By raising the gas temperature in the pre-chamber higher by insulating it, the gas leaving the chamber through the jet nozzles is at a higher temperature. That has the positive effect of stabilising the gas jets and enabling flames not to be quenched. Still further, upon the compression stroke when hot air is ingested into the capsule, conductive heat losses as the air passes through the nozzles into the capsule are minimised.

Ceramic is also less prone to deposit formation due its high surface temperature during operation, and thus coupled with DEE's inherent characteristics from this point of view results in extremely low deposit formation.

Preferably the ignition system comprises a heater configured to heat the ignition surface upon cold start or cold operation. Preferably the heater is an electrical resistive heater, more preferably a glow plug. The heater is configured to heat the ignition surface before it reaches operating temperature. Preferably, the glow plug is only activated when the engine is 'cold' (i.e. not up to a stable running temperature). The glow plug may be positioned in the path of the ignition fuel injected from the injector.

Preferably the pre-chamber volume is less than 5%, and more preferably less than 3% of the compressed cylinder volume. Beneficially, this reduces the packaging space and surface area for heat transfer.

Preferably the primary fuel supply system is configured to create a primary premixed fuel-air mixture in the combustion chamber. Preferably the primary premixed fuel-air mixture has $1.6 \leq \lambda \leq 2.0$ ('ultra-lean'). More preferably $\lambda = 2.0$ however in certain cases an engine may be operated at $\lambda > 2.0$ if the combustion system is capable. Such cases may include for example when an engine is operated at low load. In that case the fueling may be reduced while not regulating the airflow to the engine. Usually the exhaust gas temperature and effect on catalyst efficiency will be a determining factor in how lean a mixture may be permitted at lower load conditions. Preferably the cylinder and piston are configured to provide an effective compression ratio of up to 15:1, more preferably 14:1, particularly in combination with an ultra-lean fuel-air mix.

Preferably the primary fuel supply system provides a pre-mixed fuel-air mix. Preferably the primary fuel supply system is of indirect injection type. The primary fuel supply system may be an intake port injection system. Such systems are more readily implemented than direct injection systems, and due to the reduction of combustion 'knock' associated with ultra-lean combustion preferred by this invention, the usual advantages associated with direct injection are negated. Advantageously, port injection systems tend to reduce soot formation during combustion due to the excellent mixing of air and fuel before entry into the combustion chamber. The typical wall wetting and poor atomisation associated with direct injection gasoline is cause of not only excessive soot but also can lead to highly negative pre-ignition conditions.

Preferably the primary fuel is any fuel (liquid, gaseous or solid) capable of being premixed.

Preferably the cylinder defines a primary axis and the pre-chamber is intersected by the primary axis, preferably between the intake and exhaust ports and associated valves. Alternatively the pre-chamber is positioned proximate the perimeter of the cylinder similar to a Diesel swirl chamber. Preferably the at least one jet nozzle is directed towards the primary axis. Although the former solution is arguably beneficial for optimal flame distribution, the latter solution provides a better packaging solution as the implementation of e.g. swirl chambers in Diesel engines is well understood in the art.

Preferably the ignition system comprises an ignition fuel tank separate from the primary fuel tank. Preferably the ignition fuel tank is of a variable volume to prevent contact between the ignition fuel and another fluid (specifically air). For certain fuels like DEE it is important to eliminate contact with air to prevent the formation of highly unstable ether peroxide. Preferably the ignition system is configured to store the ignition fuel at a predetermined ignition fuel storage pressure, which is above atmospheric pressure. DEE has a vapour pressure of 3.9 bar at 80 degrees C. so it is necessary to prevent vapour formation using a pressurized storage system. Preferably the ignition fuel storage pressure is maintained above the vapour pressure for worst case ambient temperatures for example 5 bar (gauge) to provide an adequate safety margin.

For fuel delivery closer to the engine and specifically in the engine compartment the ambient and components temperatures will be higher than those of the storage tank typically well away from the engine compartment. In that case the DEE pressure has to be higher to prevent vapour formation in the fuel delivery lines. Given at DEE has a vapour pressure of about 10 bar at 120 degrees C., a holding pressure significantly higher will be required. Since the DEE delivery pressure to the fuel injectors should be a minimum of 100 bar, it is a proposal of the invention to use that pressure to prevent vapour formation near the engine compartment and specifically for fuel delivery components on the engine which may rise to higher temperatures during hot soak conditions. Advantageously, these features reduce the risk of ignition fuel vapourisation in the system, which would cause pumping and injection problems.

Preferably, the pre-chamber defines a plurality of jet nozzles. More preferably the plurality of jet nozzles are configured to direct the contents of the pre-chamber in diverging directions.

Preferably, the jet nozzle or plurality of jet nozzles are configured such that jets of hot gases, partially combusted fuel and flames emanate therefrom as a result of combustion in the pre-chamber.

Preferably, the jets nozzles will be dimensioned to provide the best compromise between gas velocity and allowance for flames to survive passage through them. Such jet nozzles can be tailored to suit specific combustion chamber requirements with respect to jet penetration and width. Careful design optimization can find the best compromise by varying the length to width ratio of the jet nozzle coupled with tapered inlet and outlet sections. The design must consider both outwards flowing jet gases during ignition and inward flowing air and fuel from the main chamber during charging.

The invention optionally comprises an exhaust gas injector and combustion chamber configured to utilise a portion of the ignition fuel to heat the exhaust gas downstream of the cylinder. Advantageously, this may provide additional heat in the exhaust gas to improve performance of a catalyst system.

According to a third aspect of the present invention, there is provided a vehicle internal combustion engine comprising an ignition system according to the first aspect.

According to a fourth aspect of the present invention, there is provided a vehicle comprising a vehicle internal combustion engine according to the second aspect.

According to a fifth aspect of the present invention, there is provided a vehicle having a vehicle internal combustion engine comprising: at least one cylinder defining a combustion chamber; a piston disposed for movement within at least one cylinder to define a swept volume of at least one cylinder being less than or equal to 3.0 litres; a primary fuel supply system configured to supply a primary fuel to the combustion chamber to create a primary fuel-air mix in the combustion chamber; an ignition system comprising: a capsule defining a pre-chamber having a volume less than the swept volume of the cylinder; an ignition fuel supply system configured to inject an ignition fuel, which differs from the primary fuel, to the pre-chamber to create an ignition fuel-air mix in the pre-chamber; an ignition surface within the pre-chamber, the ignition surface being defined by an interior surface of the capsule and configured to be contacted by the ignition fuel in the pre-chamber to thereby ignite the ignition fuel by hot surface ignition; and at least one jet nozzle in fluid communication with the combustion chamber of the cylinder; wherein ignition of the ignition fuel by contact with the ignition surface causes at least one of hot gases, partially combusted fuel and flames to enter the combustion chamber through the at least one jet nozzle to thereby ignite the primary fuel, wherein the primary fuel supply system comprises a primary fuel tank, and wherein the ignition fuel supply system comprises an ignition fuel tank which is separate from the primary fuel tank.

In some embodiments, the ignition fuel tank is of variable volume. The ignition fuel tank may be configured to prevent contact between ignition fuel in the ignition fuel tank and air. The ignition fuel tank may comprise a tank shell and a flexible bladder within the tank shell which is configured to be filled with the ignition fuel. The flexible bladder may be an airtight bladder.

The ignition fuel tank may comprise a tank pressure control system configured to maintain the ignition fuel at a predetermined ignition fuel storage pressure which is greater than 1 bar, for example greater than 1.5 bar, greater than 2 bar or greater than 2.5 bar. The predetermined ignition fuel storage pressure may be at least 4 bar at 20 degrees Celsius, preferably at least 5 bar at 20 degrees Celsius.

The tank pressure control system may comprise: an air compressor; a vent valve; an air pressure sensor configured to determine a pressure within the ignition fuel tank; and a tank pressure controller configured to operate the air compressor and the vent valve based on data signals received from the air pressure sensor.

The ignition fuel supply system may comprise a tank outlet conduit in communication with the ignition fuel tank at a first end and with a fuel pump at a second end, wherein the fuel pump is configured to raise the pressure of the ignition fuel from the predetermined ignition fuel tank pressure to a delivery pressure. The delivery pressure may be at least 100 bar.

The ignition fuel supply system may further comprise a fuel accumulator, a fuel pressure sensor configured to sense a pressure at the fuel accumulator, and an engine controller configured to control the fuel pump to raise the pressure of the ignition fuel to the delivery pressure to charge the fuel accumulator and to activate the fuel pump as required based on the pressure sensed by the fuel pressure sensor.

The ignition fuel may be characterised by all of the following characteristics: a carbon content by mass less than 65%; a hot surface ignition temperature less than 500 deg C.; and a volumetric energy density (LHV) greater than 18 MJ/L.

BRIEF DESCRIPTION OF THE FIGURES

An example IC engine according to the invention is described with reference to the accompanying Figures, in which.

DETAILED DESCRIPTION

Figure 1:
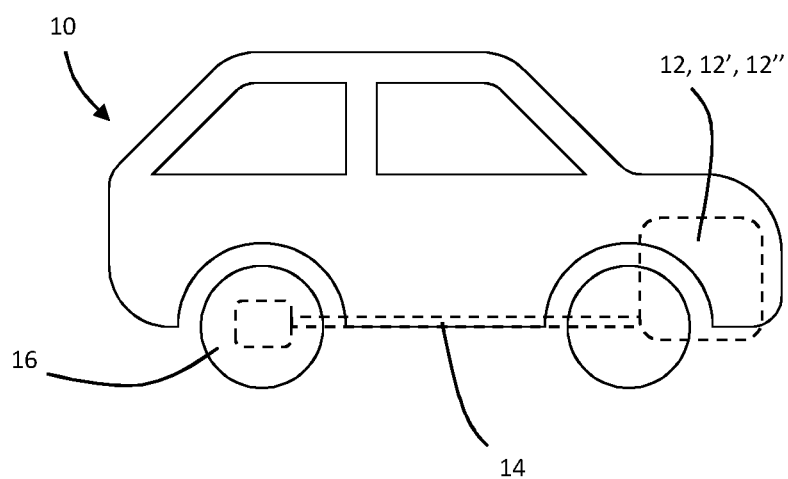
FIG. 1 is a schematic of an IC engine according to the present invention in a vehicle drivetrain.

Referring to FIG. 1, a vehicle 10, in this case and automobile comprises an internal combustion engine 12 having an output drivetrain 14 configured to drive wheels 16. The drivetrain 14 is shown schematically, but typically comprises a gearbox, differential etc. as known in the art. The engine 12 is also labelled as 12' and 12" to represent the second and third embodiments respectively.

The engine 12 is an internal combustion engine comprising a plurality of cylinders. The general configuration of such reciprocating internal combustion engines are known in the art, and will not be described in detail here.

First Embodiment

Figure 2:
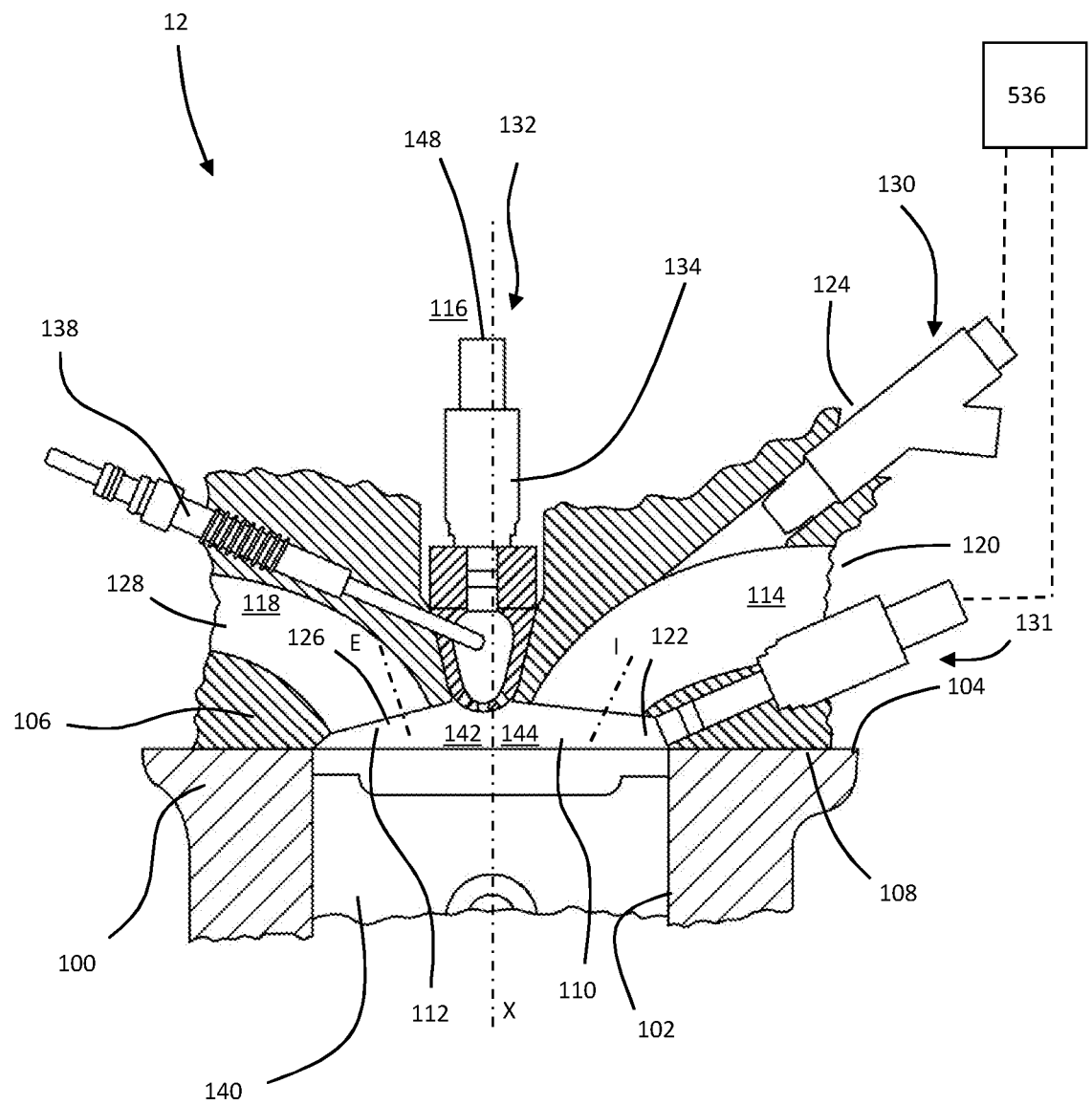
FIG. 2 is a section view of part of a first embodiment of a vehicle engine according to the present invention.

Referring to FIG. 2, a first embodiment of the present invention is shown. FIG. 2 shows a section through a part of the engine 12 according to the first embodiment. The engine 12 comprises an engine block 100, a piston 140, a cylinder head 106, a port primary fuel injector 130, a direct primary fuel injector 131 and an igniter 132.

The engine block 100 defines an engine block cylinder cavity 102 extending from an abutment surface 104 thereof. The cylinder cavity has a main cylinder axis X. The engine block 100 is constructed from a unitary (e.g. cast) metal material.

The cylinder head 106 is constructed from a unitary (e.g. cast) metal material and has an abutment surface 108 with a head cylinder cavity 110 extending therefrom. The head cylinder cavity 110 terminates at an end surface 112. The head cylinder cavity is centred on the main cylinder axis X. The cylinder head defines an intake port 114, an ignition system cavity 116 and an exhaust port 118 each of which is in communication with the head cylinder cavity via the end surface 112.

The intake port 114 is defined as a conduit in the cylinder head 106 extending from a first end 120 to a second end 122. The first end 120 is in fluid communication with an intake manifold (as known in the art) and the second end is in fluid communication with the head cylinder cavity 110 via the end surface 112. Between the first and second ends 120, 122 there is provided a fuel injector cavity 124. The second end 112 of the intake port 114 joins the end surface 112 at a position offset from the axis X, and has an intake port axis I at a non-zero angle to, and directed towards, the axis X.

The ignition system cavity 116 is in communication with the head cylinder cavity 110 and is intersected by the axis X.

The exhaust port 118 is defined as a conduit in the cylinder head 106 extending from a first end 126 to a second end 128. The first end 126 is in fluid communication with the head cylinder cavity 110 via the end surface 112 and the second end is in fluid communication with an exhaust manifold (as known in the art). The first end 126 of the exhaust port 118 joins the end surface 112 at a position offset from the axis X, and has an exhaust port axis E at a non-zero angle to, and directed away from, the axis X.

The engine block 100 and cylinder head 106 are assembled such that the engine block cylinder cavity 102 and the head cylinder cavity 110 align, thus cooperating to define a cylinder 142.

The piston 140 is disposed within the cylinder 142 for sliding movement along the cylinder axis X. The piston 140 is attached via a con rod (not shown) to a crankshaft (not shown) that provides the mechanical power output from the engine, as known in the art. The piston 140 comprises a plurality of sealing ring grooves that receive sealing rings to seal the piston 140 against the engine block cylinder cavity 102. Movement of the piston creates a variable working volume 144 within the cylinder 142.

The port primary fuel injector 130 is generally known in the art, and is positioned in the fuel injector cavity 124 of the intake port 114. Therefore it is an indirect injection (IDI) injector. The port primary fuel injector is connected to a primary fuel supply system and is configured to create a primary fuel-air mix in the intake port 114 upstream of the head cylinder cavity 110. In this embodiment the primary fuel is a fuel which lends itself to atomisation in the inlet port at low injection pressure, for example gasoline, although other fuels could be used in both liquid or gaseous form.

The direct primary fuel injector 131 is generally known in the art, and is positioned downstream of the intake port 114. It is a direct injection (DI) injector. The direct primary fuel injector is connected to a primary fuel supply system (supplied with the same primary fuel as the port injector) and is configured to create a primary fuel-air mix in the head cylinder cavity 110—i.e. in the working volume 144 of the cylinder 142. As such this embodiment has combined IDI and DI fuel injection, although it will be understood the present invention works with IDI and/or DI.

Figure 2A:
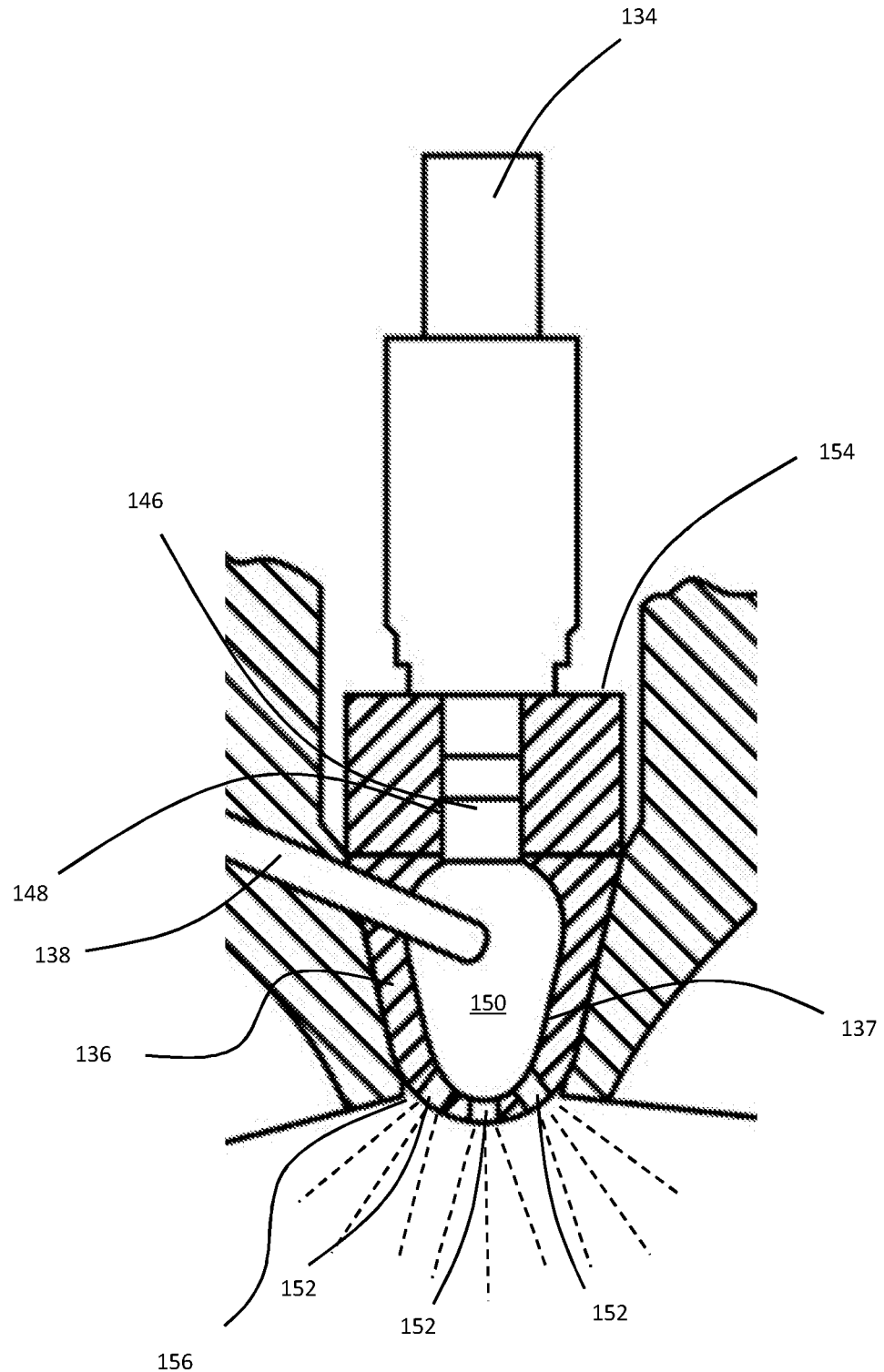
FIG. 2a is a detail view of region A of FIG. 2.

The igniter 132 is part of an ignition system (to be described below). The igniter is shown in more detail in FIG. 2a. The igniter 132 comprises an ignition fuel injector 134, an ignition capsule 136 and a glow plug 138.

The ignition fuel injector 134 is configured to inject an ignition fuel, different to the primary fuel, in this embodiment diethyl ether, into the ignition capsule 136. The ignition fuel injector comprises a nozzle 146 configured to meter, atomise and disperse the ignition fuel into the pre-chamber. The exact geometry of the injector spray plume will be optimized for the pre-chamber geometry used. As such it will ensure that the correct fuel and air mixture (as a function of the injection process) reaches the hot surfaces to initiate ignition.

The ignition capsule 136 is constructed from a ceramic material, in this embodiment Yttria partially stabilized Zirconia Oxide (YTZP) The capsule has an inlet port 148 for receiving the fuel injector 134. The capsule 136 defines a pre-chamber 150 with the inlet port 148 defined at a first end 154, and a plurality of exhaust nozzles 152 defined at a second end 156. The nozzles 152 are directed into the cylinder 142 and also radially outwardly from the axis X. The pre-chamber is tapered from the first end 154 to the second end 156. Although not shown in the drawing the ignition capsule will typically be held in place by some form of clamping device which places the ceramic capsule in compression. Appropriate sealing will be incorporated to withstand maximum firing cylinder pressures. The detailed design of the capsule will be optimized for thermal loading during operation. It will be noted that the capsule 136 defines an entirely ceramic interior surface 137 in direct contact with the chamber 150.

In this embodiment the pre-chamber volume is approximately 3% of the volume of the cylinder at piston top dead centre (i.e. the fully compressed working volume 144).

The glow plug 138 is a conventional high speed metal diesel glow plug. It is capable of reaching temperatures of around 1000 degrees C., and as such capable of heating the interior walls of the capsule in which it is embedded, to above the temperature required. Such devices are compact, with the end penetrating the capsule being in the order of 4 mm in diameter tapering to 3.3 mm. The threaded section is only an M8 thread. The glow plug 138 is positioned such that it lies in the path of the fuel spray plume from the injector 134.

Figure 7:
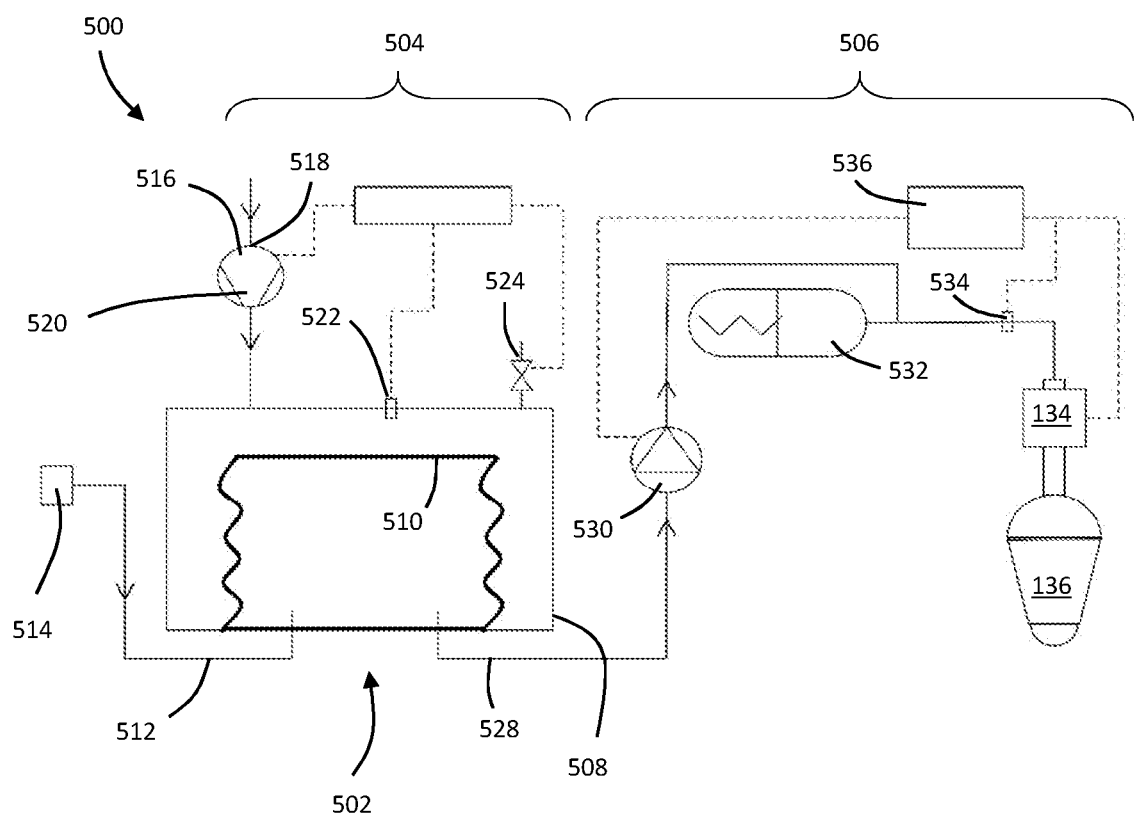

Referring to FIG. 7, an ignition fuel system 500 according to the invention is shown. The system 500 comprises an ignition fuel tank 502, a tank pressure control system 504, and an ignition fuel delivery system 506. In general, fluid lines are shown in solid line, and data/power is shown in dashed (hidden) line.

The ignition fuel tank 502 comprises a stiff tank shell 508 which is airtight (except for the inlet and outlet mentioned below). Within the shell 508 there is provided a non-permeable, flexible airtight bladder 510. The tank has a fuel filling conduit 512 that passes through the shell to be in fluid communication with the bladder 510. The fuel filling conduit 512 is connected to a fuel filling point 514 at a first end, to enable the bladder 510 to be filled with ignition fuel.

The tank pressure control system 504 comprises an air compressor 516 having an inlet 518 and an outlet 520, the outlet being in fluid communication with the shell 508. The tank pressure control system also comprises an air pressure sensor 522 configured to determine the pressure within the shell 508, a vent valve 524 in communication with the shell 508 and a tank pressure controller 526. The tank pressure controller 526 is electronic and configured to control the air compressor 516, to receive data signals from the sensor 522 indicative of the pressure within the shell 508 and to control the tank vent valve 524. The controller 526 is therefore able to control the pressure within the shell 508 (and therefore the pressure of the ignition fuel within the bladder 510) by using the sensor to determine whether the pressure is under or over a predetermined ignition fuel tank pressure and adjusting using the compressor 516 to increase the pressure or the valve 524 to decrease pressure.

The ignition fuel delivery system 506 comprises a tank outlet conduit 528 in communication with the bladder 510 at a first end, and with an electric fuel pump 530 at a second end. The system 506 further comprises a fuel accumulator 532, fuel pressure sensor 534 and the fuel injector 134. An engine controller 536 is also shown. The engine controller is configured to control the fuel pump 530 to raise the ignition fuel pressure from the predetermined ignition fuel tank pressure (which in this embodiment is 5 bar) to a delivery pressure (in this embodiment 100 bar). This charges the fuel accumulator 532. The pressure at the accumulator is sensed by the sensor 534 and the pressure reading from the sensor 534 enables the controller to raise the pressure by activating the pump 530 as and when required. The engine controller also controls the fuel injector 134, which contains an actuable valve to selectively release fuel into the chamber of the capsule 136.

Operation of the First Embodiment

Of importance to the invention (as will be clear below) is maintenance of the temperature of the interior surface 137 of the capsule 136 (TC) at a value greater than the predetermined "hot surface temperature" (HST) of the primary ignition fuel. This temperature is generally maintained by compressed gases of the main cylinder compression stroke. The gas temperature in the vicinity of the capsule will easily be raised to over 600 degrees C. for compression ratios of 12:1 and ambient air temperatures of 20 degrees C. Since the capsule is constructed from a ceramic with a low thermal conductivity, the inside surface will be heated to a high temperature without heat being conducted away.

For cold start, the glow plug 138 is activated (by the engine controller) to provide the hot surface for ignition of the ignition fuel, and furthermore pre-heat the surfaces 137 of the capsule 136 to TC>HST (the surfaces will be heated by a combination of heat from the glow plug 138 and combustion of the ignition fuel). Once TC>HST then the glow plug 138 can be deactivated. It is envisaged that once the engine is running continuously, the glow plug 138 will not be required.

The primary fuel injectors 130, 131 are controlled by an engine controller 536 to introduce gasoline fuel into the intake port 114 thus creating an ultra-lean premix in the cylinder 142. Specifically, the injectors 130, 131 are controlled to create an air-fuel mix with typically $\lambda=1.6$ to 2.0 on the intake stroke (for the purposes of this embodiment).

Following the compression stroke whereby the ultra-lean air-fuel mix is compressed in the working volume 144, the igniter is controlled to ignite the mix for the expansion stroke. A predetermined volume of ignition fuel is injected into the capsule 136 by the injector 134 as follows.

The ignition fuel (diethyl ether) is stored within the bladder 510 at the predetermined ignition fuel tank pressure (5 bar in this embodiment). The ignition fuel high pressure (in this embodiment 100 bar) delivery system from the electric fuel pump to the injector will be maintained at all times by the fuel accumulator 532. When fuel needs to be injected, the ECU controls the injector 134 to release ignition fuel for combustion into the capsule 136. This will naturally reduce the volume of the fuel delivery system 506. While the accumulator 532 is discharging to a predetermined volume, the electric high pressure pump 530 need not be operating. Once the fuel accumulator 532 has reached the threshold discharge volume, the electric high pressure pump 530 will be activated to supply 100 bar pressure to the system and re-charge the accumulator to a predetermined full capacity. As the fuel level is depleted in the tank 502, the fuel is maintained at a constant pressure of 5 bar (in this embodiment) by the tank pressure controller 526.

As the ignition fuel enters the pre-chamber, it is atomised in the compressed air and fuel present (from the prior intake stroke). As soon as the atomised ignition fuel/air mix contacts the interior surface 137 of the capsule 136, it ignites. As the flame propagates and the pressure rises inside the capsule, the flames and/or hot gases are forced through the nozzles 152 into the working volume 144 containing the ultra-lean premix. The nozzles 152 are so-shaped as to provide multiple jets of burning mixture to penetrate the working volume 144 to provide a distributed source of ignition throughout the primary fuel mix. Further, the speed of the gases from the capsule tends to cause turbulence within the compression chamber, further enhancing combustion.

This acts to ignite the lean air-fuel mix present in the volume 144 to start the expansion stroke.

Second Embodiment

Figure 3:
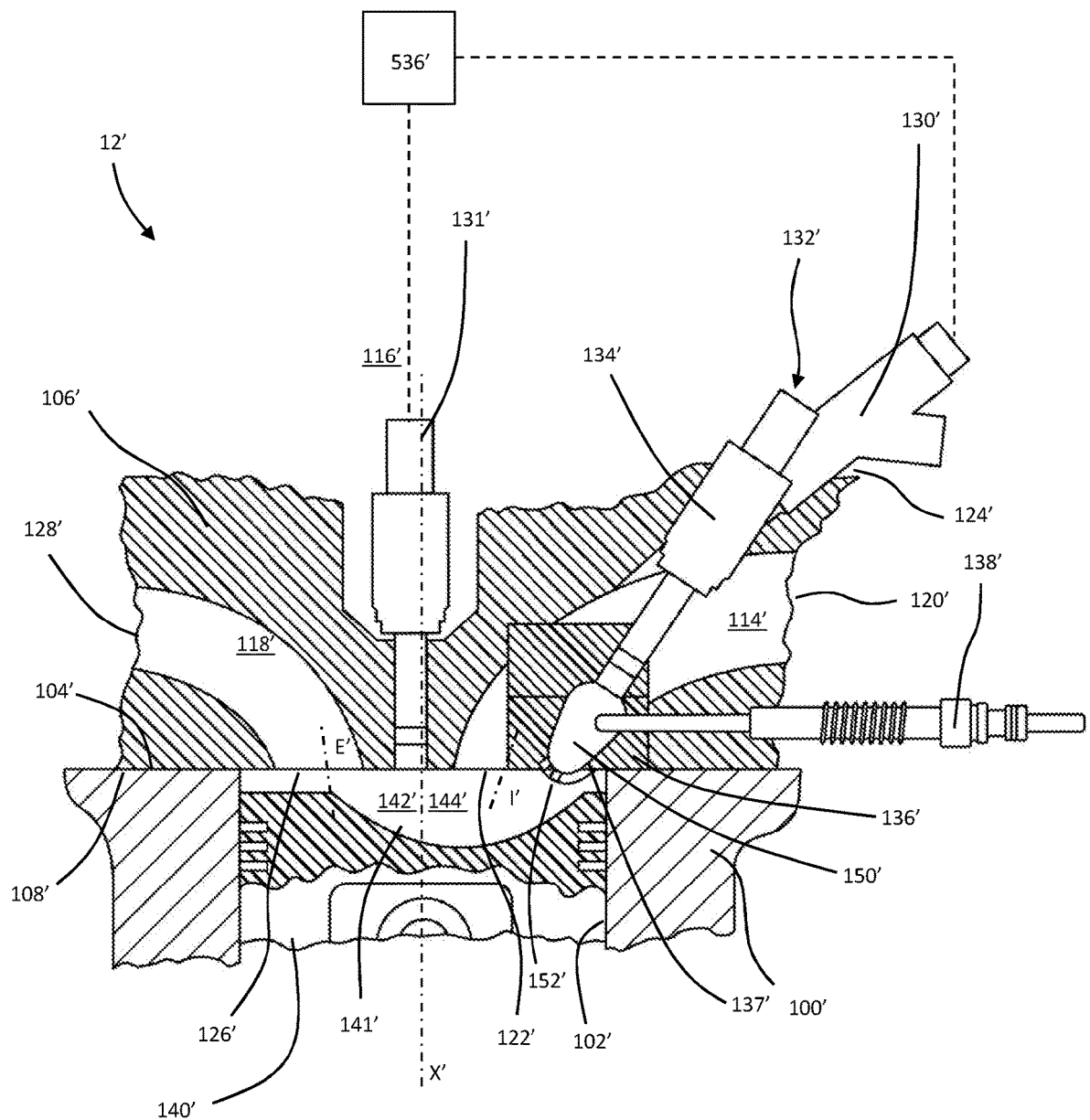
FIG. 3 is a section view of part of a second embodiment of a vehicle engine according to the present invention.

Referring to FIG. 3, a second embodiment of the present invention is shown. FIG. 3 shows a section through a part of the engine 12' according to the second embodiment. The engine 12' comprises an engine block 100', a piston 140', a cylinder head 106', a port primary fuel injector 130', a direct primary fuel injector 131' and an igniter 132'.

The engine block 100' defines an engine block cylinder cavity 102' extending from an abutment surface 104' thereof. The cylinder cavity has a main cylinder axis X'. The engine block 100' is constructed from a unitary (e.g. cast) metal material.

The cylinder head 106' is constructed from a unitary (e.g. cast) metal material and has an abutment surface 108'. The cylinder head defines an intake port 114', a primary fuel injector cavity 116' and an exhaust port 118' each of which is open to the abutment surface 108'.

The intake port 114' is defined as a conduit in the cylinder head 106' extending from a first end 120' to a second end 122'. Between the first and second ends 120', 122' there is provided a fuel injector cavity 124'. The first end 120' is in fluid communication with an intake manifold (as known in the art) and the second end is in fluid communication with the abutment surface 108'. The second end 122' of the intake port 114' joins the abutment surface 108' at a position offset from the axis X', and has an intake port axis I' at a non-zero angle to, and directed towards, the axis X'.

The ignition system cavity 116' is in communication with the abutment surface 108' and it intersected by the axis X.

The exhaust port 118' is defined as a conduit in the cylinder head 106' extending from a first end 126' to a second end 128'. The first end 126' is in fluid communication with the abutment surface 108' and the second end is in fluid communication with an exhaust manifold (as known in the art). The first end 126' of the exhaust port 118' joins the abutment surface 108' at a position offset from the axis X', and has an exhaust port axis E' at a non-zero angle to, and directed away from, the axis X'.

The engine block 100' and cylinder head 106' are assembled such that the engine block cylinder cavity 102' and the intake and exhaust ports align, thus cooperating to define a cylinder 142'.

The piston 140' is disposed within the cylinder 142' for sliding movement along the cylinder axis X'. The piston 140' is attached via a con rod (not shown) to a crankshaft (not shown) that provides the mechanical power output from the engine, as known in the art. The piston 140' defines a cavity 141' on a surface thereof forming part of a working volume 144' with the part of the cylinder 142' about the piston 140'. The piston comprises a plurality of sealing ring grooves that receive sealing rings to seal the piston 140' against the engine block cylinder cavity 102'. Movement of the piston varies the working volume 144' within the cylinder 142'.

The port primary fuel injector 130' is generally known in the art, and is positioned in the fuel injector cavity 124' of the intake port 114'. Therefore it is an indirect injection (IDI) injector. The port primary fuel injector is connected to a primary fuel supply system and is configured to create a primary fuel-air mix in the intake port 114' upstream of the cylinder. In this embodiment the primary fuel is a fuel which lends itself to atomisation in the inlet port at low injection pressure, for example gasoline, although other fuels could be used in both liquid or gaseous form.

The primary fuel injector 131' is generally known in the art, and is positioned in the fuel injector cavity 116'. The primary fuel injector is connected to a primary fuel supply system 536' and is configured to create a primary fuel-air mix in the working volume 144' via direct injection (DI). In this embodiment the primary fuel is a hydrocarbon fuel, specifically gasoline, although it will be understood that other primary fuels may be used with the invention.

The igniter 132' is part of an ignition system (to be described below). The igniter 132' comprises an ignition fuel injector 134', an ignition capsule 136' and a glow plug 138'.

The ignition fuel injector 134' is configured to inject an ignition fuel, different to the primary fuel, in this embodiment diethyl ether, into the ignition capsule 136'. The ignition fuel injector comprises a nozzle configured to atomise and disperse the ignition fuel as it exits.

The ignition capsule 136' is constructed from a ceramic material, in this embodiment Yttria partially stabilized Zirconia Oxide (YTZP). The capsule has an inlet port for receiving the fuel injector 134'. The capsule 136' defines a pre-chamber 150' with the inlet port defined at a first end, and a plurality of exhaust nozzles 152' defined at a second end. The nozzles 152' are directed into the cylinder 142' and also radially towards the axis X'. The chamber is tapered from the first end to the second end. It will be noted that the capsule 136' defines an entirely ceramic interior surface 137' in direct contact with the chamber 150'.

In this embodiment the chamber volume is 3% of the volume of the cylinder at piston top dead centre (i.e. the fully compressed working volume 144').

The glow plug 138' is a conventional high speed metal diesel glow plug. It is capable of reaching temperatures of around 1000 degrees C., and as such capable of heating the interior walls of the capsule in which it is embedded to above the temperature required. Such devices are compact, with the end penetrating the capsule being in the order of 4 mm in diameter tapering to 3.3 mm. The threaded section is only an M8 thread. The glow plug 138' is positioned such that it lies in the path of the fuel spray plume from the injector 134'.

As with the first embodiment, the ignition fuel system 500 is used to deliver fuel to the injector 134', The primary difference between the first and second embodiments is the position and orientation of the igniter 132'. In the first embodiment, the igniter 132 is intersected by the cylinder axis X, and furthermore is configured to direct the ignition plume into the axial centre of the cylinder between the intake and exhaust ports. By contrast, in the second embodiment, the igniter is positioned away from the axis X, near the periphery of the cylinder 142'. The entry point for the plumes (i.e. the nozzles 152') is closer to the cylinder periphery than to the axis X. The injector 134' is directed towards the cylinder 142' towards the piston cavity 141', and indeed towards the axis X. The glow plug 138' is engaged with the capsule in a direction normal to the axis X'.

This embodiment has certain advantages—in particular it allows for a primary fuel injector to be positioned between the intake and exhaust ports (i.e. on the axis of the cylinder), which facilitates direct primary fuel injection. Further, because it is positioned to the side, there is more space to package the igniter 132'.

Third Embodiment

Figure 4:
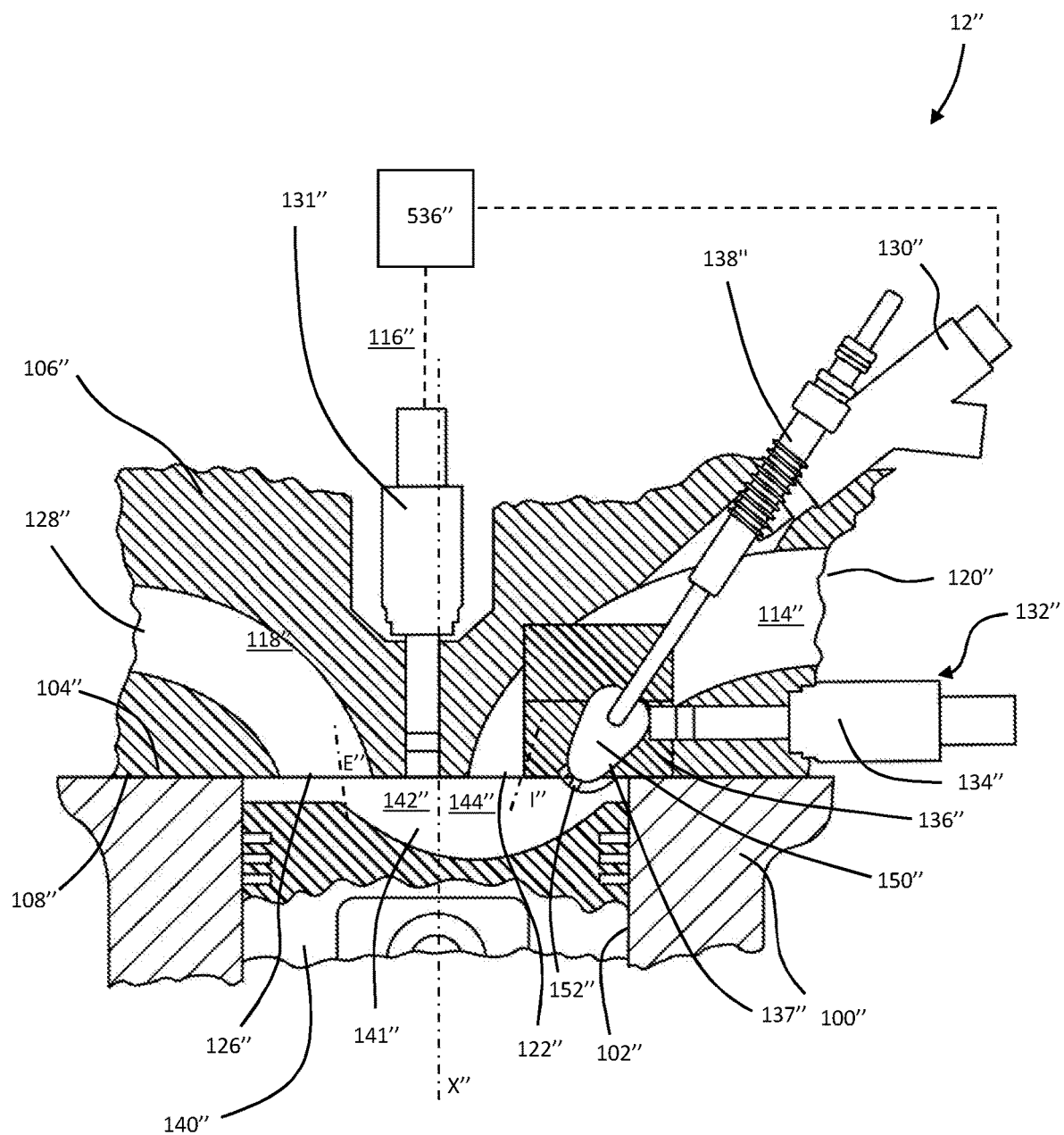
FIG. 4 is a section view of part of a third embodiment of a vehicle engine according to the present invention.

Referring to FIG. 4, a third embodiment of the present invention is shown. FIG. 4 shows a section through a part of the engine 12" according to the third embodiment. The engine 12" comprises an engine block 100", a piston 140", a cylinder head 106", a primary fuel injector 130" and an igniter 132".

The engine block 100" defines an engine block cylinder cavity 102" extending from an abutment surface 104" thereof. The cylinder cavity has a main cylinder axis X". The engine block 100" is constructed from a unitary (e.g. cast) metal material.

The cylinder head 106" is constructed from a unitary (e.g. cast) metal material and has an abutment surface 108". The cylinder head defines an intake port 114", a primary fuel injector cavity 116" and an exhaust port 118" each of which is in communication with the abutment surface 108".

The intake port 114" is defined as a conduit in the cylinder head 106" extending from a first end 120" to a second end 122". Between the first and second ends 120", 122" there is provided a fuel injector cavity 124". The first end 120" is in fluid communication with an intake manifold (as known in the art) and the second end is in fluid communication with the abutment surface 108". The second end 112" of the intake port 114" joins the end surface 122" at a position offset from the axis X", and has an intake port axis I" at a non-zero angle to, and directed towards, the axis X".

The ignition system cavity 116" is in communication with the abutment surface 108" and lies on the axis X.

The exhaust port 118" is defined as a conduit in the cylinder head 106" extending from a first end 126" to a second end 128". The first end 126" is in fluid communication with abutment surface 108" and the second end is in fluid communication with an exhaust manifold (as known in the art). The first end 126" of the exhaust port 118" joins the abutment surface 108" at a position offset from the axis X", and has an exhaust port axis E" at a non-zero angle to, and directed away from, the axis X".

The engine block 100" and cylinder head 106" are assembled such that the engine block cylinder cavity 102" defines a cylinder 142".

The piston 140" is disposed within the cylinder 142" for sliding movement along the cylinder axis X". The piston 140" is attached via a con rod (not shown) to a crankshaft (not shown) that provides the mechanical power output from the engine, as known in the art. The piston 140" defines a cavity 141" on a surface thereof forming part of a working volume 144" with the part of the cylinder 142" about the piston 140'. The piston comprises a plurality of sealing ring grooves that receive sealing rings to seal the piston 140" against the engine block cylinder cavity 102". Movement of the piston creates a variable working volume 144" within the cylinder 142".

The port primary fuel injector 130" is generally known in the art, and is positioned in the fuel injector cavity 124" of the intake port 114". Therefore it is an indirect injection (IDI) injector. The port primary fuel injector is connected to a primary fuel supply system and is configured to create a primary fuel-air mix in the intake port 114" upstream of the cylinder. In this embodiment the primary fuel is a fuel which lends itself to atomisation in the inlet port at low injection pressure, for example gasoline, although other fuels could be used in both liquid or gaseous form.

The direct primary fuel injector 131" is generally known in the art, and is positioned in the fuel injector cavity 116". The port primary fuel injector is connected to a primary fuel supply system 536" and is configured to create a primary fuel-air mix in the working volume 144" of the cylinder 142" via direct injection (DI). In this embodiment the primary fuel is a hydrocarbon fuel, specifically gasoline, although it will be understood that other primary fuels may be used with the invention.

The igniter 132" is part of an ignition system (to be described below). The igniter 132" comprises an ignition fuel injector 134", an ignition capsule 136" and a glow plug 138".

The ignition fuel injector 134" is configured to inject an ignition fuel, different to the primary fuel, in this embodiment diethyl ether, into the ignition capsule 136". The ignition fuel injector comprises a nozzle configured to atomise and disperse the ignition fuel as it exits.

The ignition capsule 136" is constructed from a ceramic material, in this embodiment Yttria partially stabilized Zirconia Oxide (YTZP). The capsule has an inlet port for receiving the fuel injector 134". The capsule 136" defines a pre-chamber 150" with the inlet port defined at a first end, and a plurality of exhaust nozzles 152" defined at a second end. The nozzles 152" are directed into the cylinder 142", in particular the piston cavity 141" and also radially towards the axis X". The chamber 150" is tapered from the first end to the second end. It will be noted that the capsule 136" defines an entirely ceramic interior surface 137" in direct contact with the chamber 150".

In this embodiment the chamber volume is 3% of the volume of the cylinder at piston top dead centre (i.e. the fully compressed working volume 144").

The glow plug 138" is a conventional high speed metal diesel glow plug. It is capable of reaching temperatures of around 1000 degrees C., and as such capable of heating the interior walls of the capsule in which it is embedded to above the temperature required. Such devices are compact, with the end penetrating the capsule being in the order of 4 mm in diameter tapering to 3.3 mm. The threaded section is only an M8 thread. The glow plug 138" is positioned such that it lies in the path of the fuel spray plume from the injector 134".

As with the first embodiment, the ignition fuel system 500 is used to delivery fuel to the injector 134", The primary difference between the second and third embodiments is the configuration of the igniter 132". Like the second embodiment, the igniter is positioned away from the axis X, near the periphery of the cylinder 142". The entry point for the plumes (i.e. the nozzles 152") is closer to the cylinder periphery than to the axis X. The injector 134" is oriented perpendicular to the axis X", directed straight towards the axis X. The glow plug 138' is engaged with the capsule in a direction at an angle to the axis X" and to the axis of the injector 134".

Figure 5:
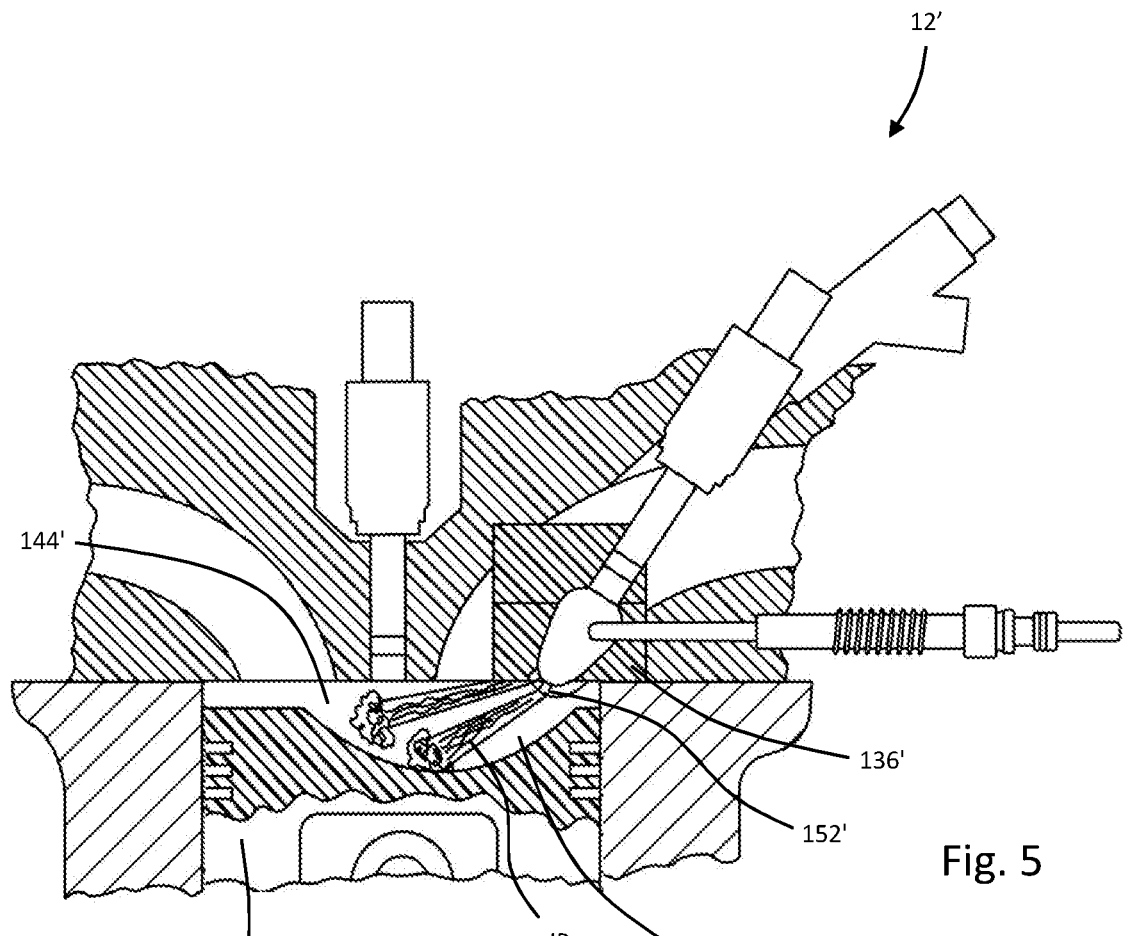
FIG. 5 is a schematic side section view through part of the engine of the third embodiment showing a jet spray pattern.
Figure 6:
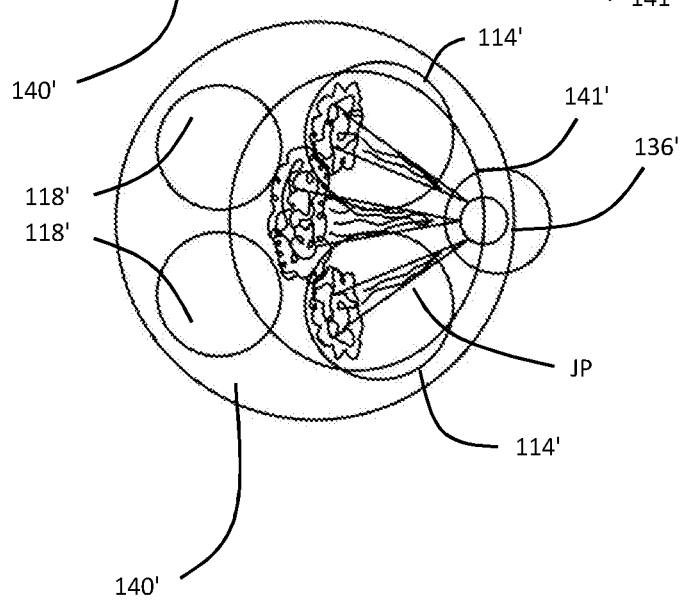
FIG. 6 is a schematic plan section view through part of the engine of the third embodiment showing a jet spray pattern; and, FIG. 7 is a schematic drawing of a fuel system for an engine according to the present invention.

Referring to FIGS. 5 and 6, jet spray patterns for the third embodiment are shown. The piston 140" has a cavity 141" on a surface thereof forming part of the working volume 144". The cavity covers most of the area of the inlet ports 114" The piston 140" is shown at TDC—i.e. with the working volume 144" at full compression. At this point most of the working volume is formed of the cavity 141". As ignition fuel is injected into the capsule 136", it ignites on the hot surface and jet plumes JP are emitted from the nozzles 152" into the working volume 144". This ignites the present air-fuel mixture to start the expansion stroke. It will be noted that the shape of the cavity 141" means that the jet plumes JP fill the working volume 144", and thus provide diffuse and turbulent ignition, ideal for lean fuel mixtures.

Variations

Referring to FIG. 1, a system is shown in which the IC engine drives the vehicle wheels via a mechanical drivetrain. The present invention may also be used in IC engines where motive power is supplied indirectly—for example in electric hybrid vehicles where the engine may be used to generate electricity wholly or partly which can then be used to drive the wheels via electric motor(s).

The above embodiments mention specific primary fuels. Other primary fuels are possible, including (but not limited to): liquid fuels including gasoline, ethanol, methanol, Diesel, gaseous fuels including Liquified Petroleum Gas (LPG), natural gas, methane and hydrogen The ignition capsule in the above embodiments is described as being constructed from Yttria partially stabilized Zirconia Oxide (YTZP) The capsule may be constructed from other ceramics such as sintered Silicon Nitride ($Si_3N_4$) or any ceramic with similar thermal conductivity, coefficient of thermal expansion, fracture toughness, bending strength and maximum service temperature properties. Superalloy metals with high temperature capability could also potentially be used.

The above embodiment specifies an ignition pre-chamber size of 3% of the cylinder volume at top dead centre. It will be noted that sized from 3 to 5% are also possible.

Although a glow plug is described for 'cold start', other means of generating heat are possible.

A pressure sensing device may be provided within the capsule to monitor the gas pressure throughout the above-described cycle.

The geometry of the capsule may be varied depending on production and packaging requirements. Some areas of the capsule may be designed such that the operating temperature is either increased or lowered compared to the rest of the capsule. Likewise the detail design will optimize the geometry of the capsule where the fuel injector is located to reduce heat transfer into the nozzle of the injector from the pre-chamber.

The second and third embodiments are similar to the first embodiment and reflect two different ignition capsule configurations. All three embodiments show combined direct (DI) and indirect (IDI) injection. Where the ignition capsule is placed at the edge of the combustion chamber (as with the second and third embodiments) it opens the possibility to use either direct injection or port injection or a combination of both. Preferably port injection is used because for premixed fuel preparation that is all that is needed. However, there may be cases where an engine designer insists on direction injection. Reasons might include (for example) direct injection of hydrogen or compressed natural gas; DI is considered the most effective way of getting the gas into an engine. It is important to recognise that in all three embodiments it is possible to use either port injection or direct injection or a combination of both (which some engine manufacturers are doing).

The invention may also be described or defined in accordance with the following clauses:

1. A vehicle internal combustion engine comprising:
    at least one cylinder defining a combustion chamber;
    a piston disposed for movement within at least one cylinder to define a swept volume of at least one cylinder being less than or equal to 3.0 litres;
    a primary fuel supply system configured to create a primary fuel-air mix in the combustion chamber;
    an ignition system comprising:
        a pre-chamber having a volume less than the swept volume of the cylinder;
        an ignition fuel supply system configured to create an ignition fuel-air mix in the pre-chamber;
        an ignition surface within the pre-chamber, the ignition surface being configured to be contacted by the ignition fuel in the pre-chamber to thereby ignite the ignition fuel by hot surface ignition;
        at least one jet nozzle in fluid communication with the combustion chamber of the cylinder;
    wherein:
    the primary fuel and the ignition fuel are different fuels, and wherein ignition of the ignition fuel by contact with the ignition surface causes at least one of hot gases, partially combusted fuel and flames to enter the combustion chamber through the at least one jet nozzle to thereby ignite the primary fuel.
2. A vehicle internal combustion engine according to clause 1, wherein the ignition fuel is a fuel which is characterised by all of the following characteristics:
    a carbon content by mass less than 65%;
    a hot surface ignition temperature less than 500 deg C.; and,
    a volumetric energy density (LHV) greater than 18 MJ/L.
3. A vehicle internal combustion engine according to clause 1 or 2, wherein the ignition fuel is an ether
4. A vehicle internal combustion engine according to clause 3, wherein the ignition fuel is diethyl ether.
5. A vehicle internal combustion engine according to any preceding clause, wherein the ignition fuel supply system is configured to inject the ignition fuel into the pre-chamber at a pressure less than 200 bar.
6. A vehicle internal combustion engine according to any preceding clause, wherein the ignition fuel supply system is configured to inject the ignition fuel into the pre-chamber of quantity less than 5% equivalent energy content of the main chamber fuel introduced into the main cylinder.
7. A vehicle internal combustion engine according to any preceding clause, wherein the primary fuel supply system is configured to premix primary fuel-air mixture prior to combustion.
8. A vehicle internal combustion engine according to clause 7, wherein the primary fuel supply system is an indirect injection system.
9. A vehicle internal combustion engine according to clause 8, wherein the primary fuel supply system comprises a port fuel injector.
10. A vehicle internal combustion engine according to clause 7, wherein the primary fuel supply system is a direct injection system.
10. A vehicle internal combustion engine according to any preceding clause, wherein the pre-chamber is at least partially constructed from a ceramic material.
11. A vehicle internal combustion engine according to clause 10, wherein the ceramic material defines part of the ignition surface.
12. A vehicle internal combustion engine according to any preceding clause, wherein the ignition system comprises a heater for providing the ignition surface upon cold start.
13. A vehicle internal combustion engine according to clause 12, wherein the heater is a glow plug.

14. A vehicle internal combustion engine according to any preceding clause, wherein the volume of the pre-chamber is less than 5.0% of the compressed volume of the working cylinder.
15. A vehicle internal combustion engine according to any preceding clause, wherein the primary fuel supply system configured to create a primary premixed fuel-air mixture in the combustion chamber.
16. A vehicle internal combustion engine according to clause 15, wherein the primary premixed fuel-air mixture has 1.6≤λ≤2.0.
17. A vehicle internal combustion engine according to any preceding clause, wherein the primary fuel is any fuel (liquid, gaseous or solid) capable of being premixed.
18. A vehicle internal combustion engine according to any preceding clause, wherein the cylinder defines a primary axis and the pre-chamber is intersected by the primary axis.
19. A vehicle internal combustion engine according to clause 18, wherein the pre-chamber is positioned proximate the perimeter of the cylinder.
20. A vehicle internal combustion engine according to clause 19, wherein the at least one jet nozzle is directed towards the primary axis.

What is claimed is:

1. A vehicle internal combustion engine comprising:
   at least one cylinder defining a combustion chamber;
   a piston disposed for movement within at least one cylinder to define a swept volume of at least one cylinder being less than or equal to 3.0 litres;
   a primary fuel supply system configured to supply a primary fuel to the combustion chamber to create a primary fuel-air mix in the combustion chamber; and
   an ignition system comprising:
      a capsule defining a pre-chamber having a volume less than the swept volume of the at least one cylinder and less than 5% of a compressed volume of the at least one cylinder;
      an ignition fuel supply system comprising an ignition fuel tank which is separate to the primary fuel tank and contains an ignition fuel which differs from the primary fuel, the ignition fuel supply system being configured to inject the ignition fuel the pre-chamber to create an ignition fuel-air mix in the pre-chamber;
      an ignition surface within the pre-chamber, the ignition surface being defined by an interior surface of the capsule and configured to be contacted by the ignition fuel in the pre-chamber to thereby ignite the ignition fuel by hot surface ignition such that ignition timing is determined by ignition fuel injection alone; and
      at least one jet nozzle in fluid communication with the combustion chamber of the cylinder;
   wherein the ignition fuel is characterised by all of the following characteristics:
   a liquid at ambient temperature and pressure;
   a carbon content by mass less than 65%;
   a hot surface ignition temperature less than 500 deg C; and,
   a volumetric energy density (LHV) greater than 18 MJ/L,
   wherein the ignition fuel supply system is configured to inject the ignition fuel into the pre-chamber in a quantity of less than 5% equivalent energy content of the primary fuel introduced into the combustion chamber;
   wherein the at least one jet nozzle is configured such that ignition of the ignition fuel by contact with the ignition surface causes at least one of hot gases, partially combusted fuel and flames to leave the pre-chamber and enter the combustion chamber through the at least one jet nozzle to thereby ignite the primary fuel.

2. The vehicle internal combustion engine according to claim 1, wherein the ignition fuel is an ether.

3. The vehicle internal combustion engine according to claim 2, wherein the ignition fuel is diethyl ether.

4. The vehicle internal combustion engine according to claim 1, wherein the ignition fuel supply system is configured to inject the ignition fuel into the pre-chamber at a pressure less than 200 bar.

5. The vehicle internal combustion engine according to claim 1, wherein the capsule is at least partially constructed from a material having one or more of the following characteristics:
   (a) a heat conductivity of below 10 W/mK;
   (b) a maximum service temperature of at least 750 degrees Celsius; and
   (c) a flexural strength of at least 500 MPa.

6. The vehicle internal combustion engine according to claim 1, wherein the capsule is at least partially constructed from a ceramic material.

7. The vehicle internal combustion engine according to claim 6, wherein the ceramic material defines the ignition surface.

8. The vehicle internal combustion engine according to claim 1, wherein the capsule is a ceramic capsule.

9. The vehicle internal combustion engine according to claim 1, wherein the capsule is a superalloy capsule.

10. The vehicle internal combustion engine according to claim 1, wherein the ignition system comprises a heater configured to heat the ignition surface upon cold start or cold operation.

11. The vehicle internal combustion engine according to claim 1, wherein the at least one cylinder defines a primary axis and the pre-chamber is intersected by the primary axis.

12. The vehicle internal combustion engine according to claim 1, wherein the pre-chamber is positioned proximate the perimeter of the at least one cylinder.

13. A vehicle internal combustion engine according to claim 12, wherein the at least one jet nozzle is directed towards the primary axis.

14. A vehicle having a vehicle internal combustion engine comprising:
   at least one cylinder defining a combustion chamber;
   a piston disposed for movement within at least one cylinder to define a swept volume of at least one cylinder being less than or equal to 3.0 litres;
   a primary fuel supply system comprising a primary fuel tank configured to supply a primary fuel from the primary fuel tank to the combustion chamber to create a primary fuel-air mix in the combustion chamber; and
   an ignition system comprising:
      a capsule defining a pre-chamber having a volume less than the swept volume of the at least one cylinder and less than 5% of a compressed volume of the at least one cylinder;
      an ignition fuel supply system comprising an ignition fuel tank which is separate to the primary fuel tank and contains an ignition fuel which differs from the primary fuel, the ignition fuel supply system being configured to inject the ignition fuel to the pre-chamber to create an ignition fuel-air mix in the pre-chamber;
      an ignition surface within the pre-chamber, the ignition surface being defined by an interior surface of the capsule and configured to be contacted by the ignition fuel in the pre-chamber to thereby ignite the ignition fuel by hot surface ignition such that ignition timing is determined by ignition fuel injection alone; and at least one jet nozzle in fluid communication with the combustion chamber of the cylinder;

wherein the ignition fuel is characterised by all of the following characteristics:

a liquid at ambient temperature and pressure;
a carbon content by mass less than 65%;
a hot surface ignition temperature less than 500 deg C; and
a volumetric energy density (LHV) greater than 18 MJ/L;

wherein the ignition fuel supply system is configured to inject the ignition fuel into the pre-chamber in a quantity of less than 5% equivalent energy content of the primary fuel introduced into the combustion chamber, wherein the at least one jet nozzle is configured such that ignition of the ignition fuel by contact with the ignition surface causes at least one of hot gases, partially combusted fuel and flames to leave the pre-chamber and enter the combustion chamber through the at least one jet nozzle to thereby ignite the primary fuel.

15. The vehicle according to claim 14, wherein the ignition fuel tank is of variable volume and is configured to prevent contact between the ignition fuel in the ignition fuel tank and air.

16. The vehicle according to claim 15, wherein the ignition fuel tank comprises a tank shell and an airtight flexible bladder within the tank shell which is configured to be filled with the ignition fuel.

17. The vehicle according to claim 15, wherein the ignition fuel tank comprises a tank pressure control system configured to maintain the ignition fuel at a predetermined ignition fuel storage pressure which is greater than 1 bar by controlling an air pressure within the tank shell.

* * * * *